(12) United States Patent
Verma et al.

(10) Patent No.: US 11,461,120 B2
(45) Date of Patent: Oct. 4, 2022

(54) METHODS AND APPARATUS FOR RACK NESTING IN VIRTUALIZED SERVER SYSTEMS

(71) Applicant: VMWARE, INC., Palo Alto, CA (US)

(72) Inventors: Shubham Verma, Bangalore (IN); Ravi Kumar Reddy Kottapalli, Bangalore (IN); Samdeep Nayak, Bangalore (IN); Kannan Balasubramanian, Bangalore (IN); Suket Gakhar, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 162 days.

(21) Appl. No.: 16/423,210

(22) Filed: May 28, 2019

(65) Prior Publication Data

US 2020/0241910 A1    Jul. 30, 2020

(30) Foreign Application Priority Data

Jan. 26, 2019   (IN) .............................. 201941003281

(51) Int. Cl.
*G06F 9/455*    (2018.01)
*G06F 9/50*     (2006.01)
*G06F 9/38*     (2018.01)

(52) U.S. Cl.
CPC ........ *G06F 9/45558* (2013.01); *G06F 9/3877* (2013.01); *G06F 9/5044* (2013.01); *G06F 2009/4557* (2013.01); *G06F 2009/45566* (2013.01)

(58) Field of Classification Search
None
See application file for complete search history.

(56) References Cited

U.S. PATENT DOCUMENTS

| | | | |
|---|---|---|---|
| 10,467,033 B2 * | 11/2019 | Tian ................... | G06F 9/45558 |
| 2015/0113144 A1 * | 4/2015 | Bauer ................ | H04L 41/0873 709/226 |
| 2016/0011894 A1 * | 1/2016 | Reddy .................... | H04L 43/16 718/1 |
| 2016/0253198 A1 * | 9/2016 | Gallant ............... | G06F 9/45558 718/1 |
| 2016/0306648 A1 * | 10/2016 | Deguillard ........... | G06F 9/4406 |

(Continued)

*Primary Examiner* — Meng Ai T An
*Assistant Examiner* — Zujia Xu
(74) *Attorney, Agent, or Firm* — Hanley, Flight & Zimmerman LLC

(57) ABSTRACT

Methods, apparatus, systems, and articles of manufacture are disclosed for rack nesting in virtualized server systems. An example apparatus includes a resource discoverer to identify resources to be allocated to the nested rack based on a policy indicative of one or more physical racks from which to identify the resources, and determine candidate resources from the resources to be allocated to the nested rack based on a capacity parameter indicative of a quantity of the resources available to be allocated to the nested rack, the candidate resources to have first hypervisors, and a nested rack controller to generate the nested rack by deploying second hypervisors on the first hypervisors, the second hypervisors to facilitate communication between the candidate resources and one or more virtual machines on the second hypervisors, the nested rack to execute one or more computing tasks based on the communication.

21 Claims, 10 Drawing Sheets

(56) References Cited

U.S. PATENT DOCUMENTS

| | | | |
|---|---|---|---|
| 2017/0003951 A1* | 1/2017 | Newell | G06F 8/70 |
| 2017/0031622 A1* | 2/2017 | Nagarajan | G06F 3/0607 |
| 2018/0074864 A1* | 3/2018 | Chen | G06F 9/5022 |
| 2020/0099586 A1* | 3/2020 | Li | H04L 67/1008 |
| 2020/0125382 A1* | 4/2020 | Castet | G06F 8/65 |

* cited by examiner

METHODS AND APPARATUS FOR RACK NESTING IN VIRTUALIZED SERVER SYSTEMS

RELATED APPLICATIONS

Benefit is claimed under 35 U.S.C. 119(a)-(d) to Foreign Application Serial No. 201941003281 filed in India entitled "METHODS AND APPARATUS FOR RACK NESTING IN VIRTUALIZED SERVER SYSTEMS", on Jan. 26, 2019, by VMware, Inc., which is herein incorporated in its entirety by reference for all purposes.

FIELD OF THE DISCLOSURE

This disclosure relates generally to cloud computing and, more particularly, to methods and apparatus for rack nesting in virtualized server systems.

BACKGROUND

Virtualizing computer systems provides benefits such as the ability to execute multiple computer systems on a single hardware computer, replicating computer systems, moving computer systems among multiple hardware computers, and so forth. "Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many processing units (e.g., servers, computing resources, etc.). The processing units may be installed in standardized frames, known as racks, which provide efficient use of floor space by allowing the processing units to be stacked vertically. The racks may additionally include other components of a cloud computing environment such as storage devices, networking devices (e.g., routers, switches, etc.), etc.

Figure 1:
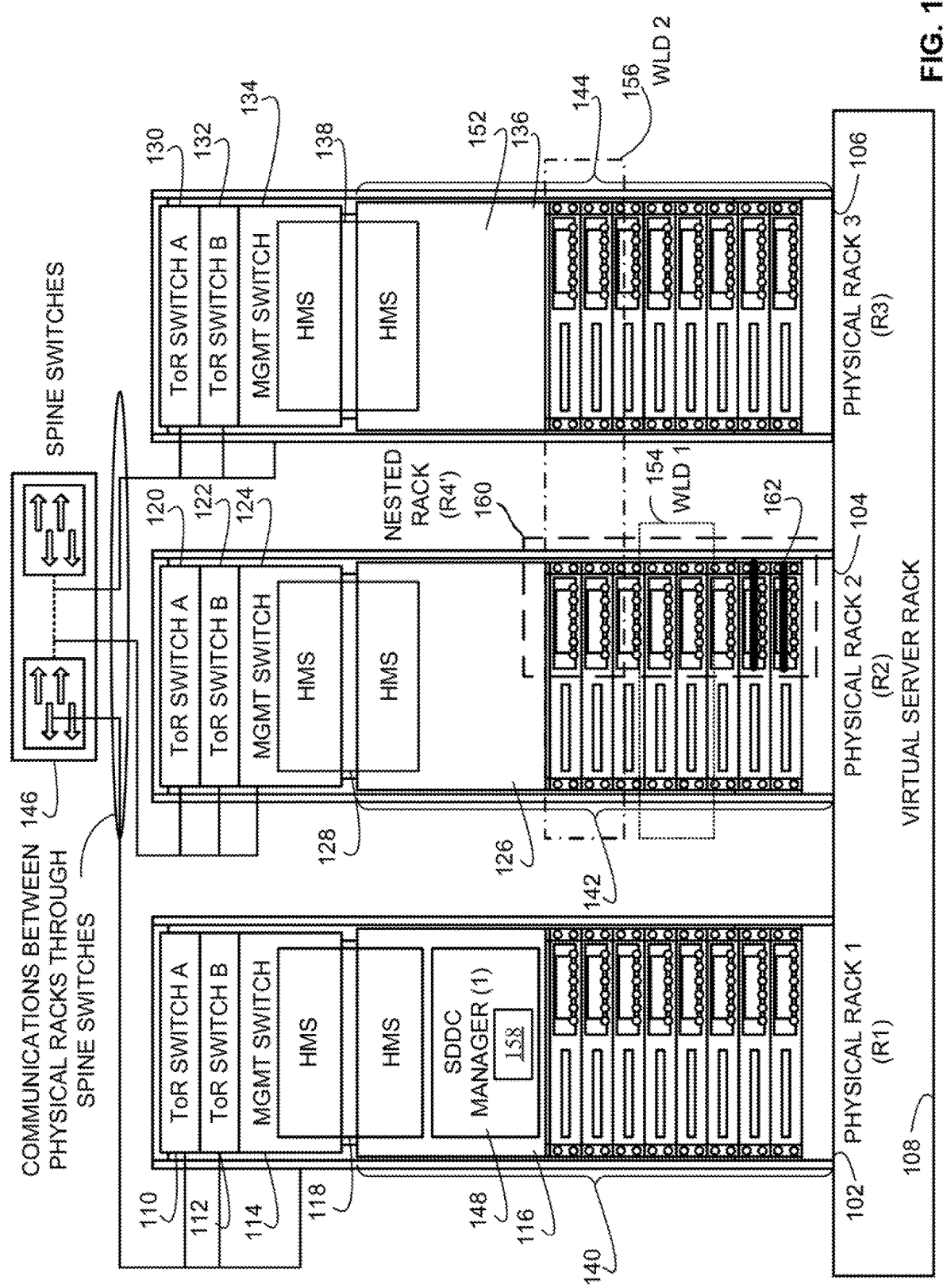
FIG. 1 illustrates an example nested rack included in a physical rack of an example virtual server rack deployment.

The figures are not to scale. In general, the same reference numbers will be used throughout the drawing(s) and accompanying written description to refer to the same or like parts. Connecting lines or connectors shown in the various figures presented are intended to represent example functional relationships and/or physical or logical couplings between the various elements. Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Cloud computing is based on the deployment of many physical resources across a network, virtualizing the physical resources into virtual resources, and provisioning the virtual resources in software defined data centers (SDDCs) for use across cloud computing services and applications. Examples disclosed herein can be used to manage network resources in SDDCs to improve performance and efficiencies of network communications between different virtual and/or physical resources of the SDDCs.

Examples disclosed herein can be used in connection with different types of SDDCs. In some examples, techniques disclosed herein are useful for managing network resources that are provided in SDDCs based on Hyper-Converged Infrastructure (HCI). In some examples, HCI combines a virtualization platform such as a hypervisor, virtualized software-defined storage, and virtualized networking in an SDDC deployment. An SDDC manager can provide automation of workflows for lifecycle management and operations of a self-contained private cloud instance. Such an instance may span multiple racks of servers connected via a leaf-spine network topology and connects to the rest of the enterprise network for north-south connectivity via well-defined points of attachment. The leaf-spine network topology is a two-layer data center topology including leaf switches (e.g., switches to which servers, load balancers, edge routers, storage resources, etc., connect) and spine switches (e.g., switches to which leaf switches connect, etc.). In such a topology, the spine switches form a backbone of a network, where every leaf switch is interconnected with each and every spine switch.

Examples disclosed herein can be used with one or more different types of virtualization environments. Three example types of virtualization environments are: full virtualization, paravirtualization, and operating system (OS) virtualization. Full virtualization, as used herein, is a virtualization environment in which hardware resources are managed by a hypervisor to provide virtual hardware resources to a virtual machine (VM). In a full virtualization environment, the VMs do not have access to the underlying hardware resources. In a typical full virtualization, a host OS with embedded hypervisor (e.g., a VMWARE® ESXI® hypervisor, etc.) is installed on the server hardware. VMs including virtual hardware resources are then deployed on the hypervisor. A guest OS is installed in the VM. The hypervisor manages the association between the hardware resources of the server hardware and the virtual resources allocated to the VMs (e.g., associating physical random-access memory (RAM) with virtual RAM, etc.). Typically, in full virtualization, the VM and the guest OS have no visibility and/or access to the hardware resources of the underlying server. Additionally, in full virtualization, a full guest OS is typically installed in the VM while a host OS is installed on the server hardware. Example virtualization environments include VMWARE® ESX® hypervisor, Microsoft HYPER-V® hypervisor, and Kernel Based Virtual Machine (KVM).

Paravirtualization, as used herein, is a virtualization environment in which hardware resources are managed by a hypervisor to provide virtual hardware resources to a VM, and guest OSs are also allowed to access some or all the underlying hardware resources of the server (e.g., without accessing an intermediate virtual hardware resource, etc.). In a typical paravirtualization system, a host OS (e.g., a Linux-based OS, etc.) is installed on the server hardware. A hypervisor (e.g., the XEN® hypervisor, etc.) executes on the host OS. VMs including virtual hardware resources are then deployed on the hypervisor. The hypervisor manages the association between the hardware resources of the server hardware and the virtual resources allocated to the VMs (e.g., associating RAM with virtual RAM, etc.). In paravirtualization, the guest OS installed in the VM is configured also to have direct access to some or all of the hardware resources of the server. For example, the guest OS can be precompiled with special drivers that allow the guest OS to access the hardware resources without passing through a virtual hardware layer. For example, a guest OS can be precompiled with drivers that allow the guest OS to access a sound card installed in the server hardware. Directly accessing the hardware (e.g., without accessing the virtual hardware resources of the VM, etc.) can be more efficient, can allow for performance of operations that are not supported by the VM and/or the hypervisor, etc.

OS virtualization is also referred to herein as container virtualization. As used herein, OS virtualization refers to a system in which processes are isolated in an OS. In a typical OS virtualization system, a host OS is installed on the server hardware. Alternatively, the host OS can be installed in a VM of a full virtualization environment or a paravirtualization environment. The host OS of an OS virtualization system is configured (e.g., utilizing a customized kernel, etc.) to provide isolation and resource management for processes that execute within the host OS (e.g., applications that execute on the host OS, etc.). The isolation of the processes is known as a container. Thus, a process executes within a container that isolates the process from other processes executing on the host OS. Thus, OS virtualization provides isolation and resource management capabilities without the resource overhead utilized by a full virtualization environment or a paravirtualization environment. Example OS virtualization environments include Linux Containers LXC and LXD, the DOCKER™ container platform, the OPENVZ™ container platform, etc.

In some examples, a data center (or pool of linked data centers) can include multiple different virtualization environments. For example, a data center can include hardware resources that are managed by a full virtualization environment, a paravirtualization environment, an OS virtualization environment, etc., and/or a combination thereof. In such a data center, a workload can be deployed to any of the virtualization environments. In some examples, techniques to monitor both physical and virtual infrastructure, provide visibility into the virtual infrastructure (e.g., VMs, virtual storage, virtual or virtualized networks and their control/management counterparts, etc.) and the physical infrastructure (e.g., servers, physical storage, network switches, etc.).

Examples disclosed herein can be employed with HCI-based SDDCs deployed using virtual server rack systems such as the virtual server rack 108 of FIG. 1. A virtual server rack system can be managed using a set of tools that is accessible to all modules of the virtual server rack system. Virtual server rack systems can be configured in many different sizes. Some systems are as small as four hosts, and other systems are as big as tens of racks. As described in more detail below in connection with FIGS. 1 and 2, multi-rack deployments can include Top-of-the-Rack (ToR) switches (e.g., leaf switches, etc.) and spine switches connected using a Leaf-Spine architecture. A virtual server rack system also includes software-defined data storage (e.g., storage area network (SAN), VMWARE® VIRTUAL SAN™, etc.) distributed across multiple hosts for redundancy and virtualized networking software (e.g., VMWARE NSX™, etc.).

Examples disclosed herein provide HCI-based SDDCs with system-level governing features that can actively monitor and manage different hardware and software components of a virtual server rack system even when such different hardware and software components execute different OSs. As described in connection with FIG. 2, major components of a virtual server rack system can include a hypervisor, network virtualization software, storage virtualization software (e.g., software-defined data storage, etc.), a physical network OS, and external storage. In some examples, the storage virtualization (e.g., VMWARE VIRTUAL SAN™, etc.) is integrated with the hypervisor. In examples in which the physical network OS is isolated from the network virtualization software, the physical network is not aware of events occurring in the network virtualization environment and the network virtualization environment is not aware of events occurring in the physical network.

When starting up a cloud computing environment or adding resources to an already established cloud computing environment, data center operators struggle to offer cost-effective services while making resources of the infrastructure (e.g., storage hardware, computing hardware, and networking hardware) work together to achieve simplified installation/operation and optimize the resources for improved performance. Prior techniques for establishing and maintaining data centers to provide cloud computing services often require customers or users to understand details and configurations of hardware resources to establish workload domains in which to execute customer services. As used herein, the term "workload domain" refers to virtual hardware policies or subsets of virtual resources of a VM mapped to physical hardware resources to execute a user application.

In examples disclosed herein, workload domains are mapped to a management domain deployment (e.g., a cluster of hosts managed by a vSphere management product developed and provided by VMware, Inc.) in a single rack deployment in a manner that is relatively easier to understand and operate by users (e.g., clients, customers, etc.) than prior techniques. In this manner, as additional racks are added to a system, cross-rack clusters become an option. This enables creating more complex configurations for workload domains as there are more options for deployment as well as additional management domain capabilities that can be leveraged. Examples disclosed herein facilitate making workload domain configuration and management easier than prior techniques.

A management domain is a group of physical machines and/or VMs that host core cloud infrastructure components necessary for managing a SDDC in a cloud computing environment that supports customer services. Cloud computing allows ubiquitous, convenient, on-demand network access to a shared pool of configurable computing resources (e.g., a pool of hardware resources, etc.). A cloud computing customer can request allocations of such resources to support services required by those customers. For example, when a customer requests to run one or more services in the cloud computing environment, one or more workload domains may be created based on resources in the shared pool of configurable computing resources. Examples disclosed herein enable customers to define different domain types, security, machine learning, availability, capacity, and performance requirements for establishing workload domains in server rack deployments without requiring the users to have in-depth knowledge of server rack hardware and/or configurations. In some examples, the requirements include a quantity of tiers in an application (e.g., a three-tier application, a four-tier application, etc.), a quantity of buffer or excess storage capacity on one or more hosts, a fault tolerance level (e.g., a failure-to-tolerate (FTT) level of three), a duration of a workload domain (e.g., a workload domain to be deleted and associated hardware decomposed after three days, seven days, etc.), etc., and/or a combination thereof.

As used herein, availability refers to the level of redundancy required to provide continuous operation expected for the workload domain. As used herein, performance refers to the computer processing unit (CPU) operating speeds (e.g., CPU gigahertz (GHz)), memory (e.g., gigabytes (GB) of random access memory (RAM)), mass storage (e.g., GB hard drive disk (HDD), GB solid state drive (SSD), etc.), and power capabilities of a workload domain. As used herein, capacity refers to the aggregate number of resources (e.g., aggregate storage, aggregate CPU, aggregate respective hardware accelerators (e.g., field programmable gate arrays (FPGAs), graphic processing units (GPUs)), etc.) across all servers associated with a cluster and/or a workload domain. In examples disclosed herein, the number of resources (e.g., capacity) for a workload domain is determined based on the redundancy, the CPU operating speed, the memory, the storage, the security, and/or the power requirements selected by a user. For example, more resources are required for a workload domain as the user-selected requirements increase (e.g., higher redundancy, CPU speed, memory, storage, security, and/or power options require more resources than lower redundancy, CPU speed, memory, storage, security, and/or power options). In some examples, resources are computing devices with set amounts of storage, memory, CPUs, etc. In some examples, resources are individual devices (e.g., hard drives, processors, memory chips, etc.).

In prior implementations of executing maintenance tasks, such as performing an upgrade (e.g., a firmware upgrade, a hardware upgrade, a software upgrade, etc.), a user typically purchases and/or otherwise obtain loaner hosts prior to executing the maintenance tasks. For example, a user has three racks R1, R2, and R3 in a virtual server rack, and uses all the hosts on R2 for first VMs on workload domain WD1 and uses all the hosts on R3 for second VMs on workload domain WD2. In such examples, if the user wants to upgrade the servers of R3 from hardware version A to hardware version B and does not want downtime of WD1 and WD2, the user typically has to obtain enough loaner hosts (e.g., loaner hosts L1, L2, L3, etc., with hardware version A for compatibility) to live migrate from the existing hosts of R3 to the loaner hosts. For example, although there may be free hosts on R1, VMs from WD2 cannot be readily migrated to the free hosts on R1 and, instead, are typically live migrated to the loaner hosts.

In prior implementations of executing a live migration within a virtualized server system, the user manually images the loaner hosts (e.g., imaging the loaner hosts with the same hypervisor versions used by the hosts on R3 for compatibility) and adds them to workload domain WD2 one-by-one prior to live migrating the second VMs from the existing hosts on R3 to the loaner hosts also one-by-one with no existing automation. In addition to obtaining the loaner hosts, the user typically obtains spare storage resources to make a backup of the existing storage on the hosts of R3 in case the live migration to the loaner hosts fail. If the live migration is successful, the user typically adds a new rack R4 (to workload domain WD2) including physical hosts with the upgraded hardware version B to the virtual server rack. After adding R4 to the virtual server rack, the user again live migrates the second VMs on the loaner hosts to the hosts in R4 one-by-one with no existing automation. If the live migration to R4 is successful, the user decommissions the loaner hosts (post removal from workload domain WD2) and the spare storage resources. In some instances, the user physically destroys the decommissioned equipment to prevent accidental or malicious data theft.

Such prior implementations of performing maintenance tasks on virtual server racks are monetarily expensive and demand extensive manual effort to perform. Such prior implementations may require the user to have spare loaner hosts for migration and spare storage resources for manual backups require the user to properly dispose of electronic waste due to decommissioning. In some instances, performing such maintenance tasks in prior implementations takes multiple days to accomplish depending on the size of the data and the VMs. Further, possible breaches of data security may arise during or after the live migration.

Prior implementations correspond to non-optimal usages of existing HCI resources in the existing infrastructure. For example, hosts on R1 and/or other racks in the virtual server rack may include enough loanable resources to accommodate the VMs and/or containers from R3. In such instances, horizontal as well as vertical loaning may provide a better solution to the practical application of managing and provisioning physical and virtual resources in a virtualized server system.

Examples disclosed herein describe rack nesting in virtualized server systems. In some disclosed examples, an example nested rack manager (NRM) builds, manages, and decommissions virtual racks nested in existing physical racks. As used herein, the terms "nested rack" or "nested virtual rack" refer to a set of one or more resources (e.g., physical resources, virtual resources, etc.) associated with one or more physical racks assigned to one or more SDDC containers included in an existing SDDC manager to facilitate the operation of VMs, containers, etc. The nested rack provides a means for resource management of the one or more nested SDDC containers within the existing SDDC manager. In some disclosed examples, the NRM performs static nested rack resource allocation by obtaining a resource policy (e.g., from a user, a database, etc.) indicative of resources on a given physical rack to be allocated for nested rack generation. In some disclosed examples, the NRM performs dynamic nested rack resource allocation by identifying available resources for nested rack creation using an example nested rack resource pool table.

In some disclosed examples, the NRM identifies and aggregates resources such as accelerator resources, compute resources, network resources, security resources, and/or storage resources that can be offered or made available by hosts on existing physical racks for creating nested racks. The example NRM may use the available resources to image nested VMs on associated hosts of the available resources in the existing physical racks. In response to utilizing existing resources to generate a nested rack, the example NRM can facilitate tasks such as expanding a workload domain to include the nested rack, live migrating existing VMs to the expanded workload domain, and performing maintenance on the resources underlying the existing VMs. For example, hardware, firmware, and/or software upgrades may be performed on the resources by substantially reducing or eliminating downtime and/or costs from obtaining loaner hosts and spare storage. In such examples, existing physical resources can be reallocated to generate a nested rack to improve the efficiency and utilization of resources associated with a virtualized server environment compared to prior implementations.

FIG. 1 illustrates example physical racks 102, 104, 106 in an example deployment of an example virtual server rack 108. The physical racks 102, 104, 106 include an example first physical rack (R1) 102, an example second physical rack (R2) 104, and an example third physical rack 106. The virtual server rack 108 of FIG. 1 is a virtual server environment. The virtual server rack 108 of the illustrated example enables abstracting hardware resources (e.g., physical hardware resources 140, 142, 144, etc.). In FIG. 1, the physical hardware resources 140, 142, 144 include first example physical hardware resources 140 included in the first physical rack 102, second example physical hardware resources 142 included in the second physical rack 104, and third example physical hardware resources 144 included in the third physical rack 106.

In some examples, a cloud computing environment includes one or more virtual server racks such as the virtual server rack 108 of FIG. 1. In some examples, the virtual server rack 108 includes a set of physical units (e.g., one or more racks, etc.) with each unit including hardware such as server nodes (e.g., compute+storage+network links, etc.), network switches, and, optionally, separate storage units. Additionally or alternatively, the physical racks 102, 104, 106 may include accelerator resources (e.g., GPUs), security resources (e.g., hardware that performs cryptography, network intrusion detection and/or prevention, etc.), etc. From a user perspective, the virtual server rack 108 is an aggregated pool of logical resources (e.g., virtual resources) exposed as one or more VMWARE® ESXI™ clusters along with a logical storage pool and network connectivity. As used herein, the term "cluster" refers to a server group in a virtual environment. For example, a VMWARE ESXI™ cluster is a group of physical servers in the physical hardware resources that run VMWARE ESXI™ hypervisors to virtualize processor, memory, storage, and networking resources into logical resources to run multiple VMs that run OSs and applications as if those OSs and applications were running on physical hardware without an intermediate virtualization layer.

In the illustrated example, the first physical rack 102 has an example ToR Switch A 110, an example ToR Switch B 112, an example management (MGMT) switch 114, and a plurality of example server host nodes 116. In the illustrated example, the server host nodes 116, 126, 136 are HCI hosts where computing and storage hardware resources are included in the same node. In FIG. 1, the server host nodes 116, 126, 136 include first example first server host nodes(0-7) 116 included in the first physical rack 102, example second server host nodes(0-7) 126 included in the second physical rack 104, and example third server host nodes(0-7) 136 included in the third physical rack 106. In FIG. 1, the first physical rack 102 includes eight of the first server host nodes 116 (e.g., server host nodes(0-7) 116). In the illustrated example, the management switch 114 and the server host node(0) 116 run a hardware management system (HMS) 118 for the first physical rack 102.

The second physical rack 104 of the illustrated example is also provided with an example ToR Switch A 120, an example ToR Switch B 122, an example management switch 124, and a plurality of example server host nodes 126. In FIG. 1, the second physical rack 104 includes eight of the second server host nodes 126 (e.g., server host nodes(0-7) 126). In the illustrated example, the management switch 124 and the server host node(0) 126 run an HMS 128 for the second physical rack 104. The third physical rack 106 of the illustrated example is also provided with an example ToR Switch A 130, an example ToR Switch B 132, an example management switch 134, and a plurality of example server host nodes 136. In FIG. 1, the third physical rack 106 includes eight of the third server host nodes 136 (e.g., server host nodes(0-7) 136). In the illustrated example, the management switch 134 and the server host node(0) 136 run an HMS 138 for the third physical rack 106.

In the illustrated example, the HMS 118, 128, 138 connects to server management ports of the server host node(0) 116, 126, 136 (e.g., using a baseboard management controller (BMC), etc.), connects to ToR switch management ports (e.g., using 1 gigabits per second (Gbps) links, 10 Gbps links, etc.) of the ToR switches 110, 112, 120, 122, 130, 132, and also connects to spine switch management ports of one or more example spine switches 146. In the illustrated example, the ToR switches 110, 112, 120, 122, 130, 132, implement leaf switches such that the ToR switches 110, 112, 120, 122, 130, 132, and the spine switches 146 are in communication with one another in a leaf-spine switch configuration. These example connections form a non-routable private IP management network for out-of-band (OOB) management. The HMS 118, 128, 138 of the illustrated example uses this OOB management interface to the server management ports of the server host node(0) 116, 126, 136 for server hardware management. In addition, the HMS 118, 128, 138 of the illustrated example uses this OOB management interface to the ToR switch management ports of the ToR switches 110, 112, 120, 122, 130, 132 and to the spine switch management ports of the one or more spine switches 146 for switch management.

In the illustrated example, the ToR switches 110, 112, 120, 122, 130, 132 connect to server NIC ports (e.g., using 10 Gbps links, etc.) of server hosts in the physical racks 102, 104, 106 for downlink communications and to the spine switch(es) 146 (e.g., using 40 Gbps links, etc.) for uplink communications. In the illustrated example, the management switch 114, 124, 134 is also connected to the ToR switches 110, 112, 120, 122, 130, 132 (e.g., using a 10 Gbps link, etc.) for internal communications between the management switch 114, 124, 134 and the ToR switches 110, 112, 120, 122, 130, 132. Also in the illustrated example, the HMS 118, 128, 138 is provided with in-band (IB) connectivity to individual server nodes (e.g., server nodes in example physical hardware resources 140, 142, 144, etc.) of the physical rack 102, 104, 106. In the illustrated example, the IB connection interfaces to physical hardware resources 140, 142, 144 via an OS running on the server nodes using an OS-specific application programming interface (API) such as VMWARE VSPHERE® API, command line interface (CLI), and/or interfaces such as Common Information Model from Distributed Management Task Force (DMTF).

Example OOB operations performed by the HMS 118, 128, 138 include discovery of new hardware, bootstrapping, remote power control, authentication, hard resetting of non-responsive hosts, monitoring catastrophic hardware failures, and firmware upgrades. The example HMS 118, 128, 138 uses IB management to periodically monitor status and health of the physical hardware resources 140, 142, 144 and to keep server objects and switch objects up to date. Example IB operations performed by the HMS 118, 128, 138 include controlling power state, accessing temperature sensors, controlling Basic Input/Output System (BIOS) inventory of hardware (e.g., CPUs, memory, disks, etc.), event monitoring, and logging events.

The HMSs 118, 128, 138 of the corresponding physical racks 102, 104, 106 interface with an example software-defined data center (SDDC) manager 148 (that manages the physical racks 102, 104, 106) to instantiate and manage the virtual server rack 108 using physical hardware resources 140, 142, 144 (e.g., processors, NICs, servers, switches, storage devices, peripherals, power supplies, etc.) of the physical racks 102, 104, 106. In the illustrated example, the SDDC manager 148 runs on a cluster of three server host nodes of the first physical rack 102, one of which is the first server host node(0) 116.

In some examples, the term "host" refers to a functionally indivisible unit of the physical hardware resources 140, 142, 144, such as a physical server that is configured or allocated, as a whole, to a virtual rack and/or workload; powered on or off in its entirety; or may otherwise be considered a complete functional unit. For example, an entirety or a portion of the first server host node(0) 116 may correspond to a host. In such examples, a portion or subset of the compute resources, network resources, and storage resources of the first server host node(0) 116 can correspond to a host. In other examples, an entirety of the compute resources, network resources, and storage resources of the first server host node(0) 116 can correspond to a host.

In the illustrated example, communications between physical hardware resources 140, 142, 144 of the physical racks 102, 104, 106 are exchanged between the ToR switches 110, 112, 120, 122, 130, 132 of the physical racks 102, 104, 106 through the one or more spine switches 146. In the illustrated example, each of the ToR switches 110, 112, 120, 122, 130, 132 is connected to each of two spine switches 146. In other examples, fewer or more spine switches may be used. For example, additional spine switches may be added when physical racks are added to the virtual server rack 108.

The SDDC manager 148 runs on a cluster of three server host nodes (e.g., first server host nodes(0-2) 116) of the first physical rack 102 using a high availability (HA) mode configuration. Using the HA mode in this manner enables fault tolerant operation of the SDDC manager 148 in the event that one of the three server host nodes in the cluster for the SDDC manager 148 fails. Upon failure of a server host node executing the SDDC manager 148, the SDDC manager 148 can be restarted to execute on another one of the hosts in the cluster. Therefore, the SDDC manager 148 continues to be available even in the event of a failure of one of the server host nodes in the cluster.

The HMS 118, 128, 138 of the illustrated example of FIG. 1 is a stateless software agent responsible for managing individual hardware resources in the physical rack 102, 104, 106. Examples of hardware elements that the HMS 118, 128, 138 manages are servers and network switches in the physical rack 102, 104, 106. In the illustrated example, the HMS 118, 128, 138 is implemented using Java on Linux so that an OOB management portion of the HMS 118, 128, 138 runs as a Java application on a white box management switch (e.g., the management switch 114, 124, 134, etc.) in the physical rack 102, 104, 106. However, any other programming language and any other OS may be used to implement the HMS 118, 128, 138.

In FIG. 1, the SDDC manager 148 directs a deployment of a first example workload domain (WLD1) 154 and/or a second example workload domain (WLD2) 156 to a user environment (e.g., a cloud computing environment associated with a user). The workload domains 154, 156 of the illustrated example of FIG. 1 can execute a computing task specified by a user such as executing an application, processing data, performing a calculation, etc. As used herein, the term "user environment" refers to a system under control, moderation, and/or supervision of an external entity such as a client (e.g., an automation client, a user interface (UI) client, etc.), a user (e.g., a data center operator), etc., to which resources (e.g., the physical hardware resources 140, 142, 144, virtual resources, etc.) are allocated. For example, the user environment may correspond to the virtual server rack 108 of FIG. 1.

In FIG. 1, the SDDC manager 148 deployed two hosts corresponding to the second server host nodes(3-4) 126 to the first workload domain 154. In FIG. 1, the SDDC manager 148 deployed four host corresponding to the second server host nodes(0-1) 126 and the third server host nodes(0-1) 136 to the second workload domain 156.

The SDDC manager 148 of FIG. 1 includes an example nested rack manager (NRM) 158 to build and manage virtual racks nested within one or more of the physical racks 102, 104, 106 to improve allocation flexibility and utilization of existing ones of the physical hardware resources 140, 142, 144. The virtual racks can be used to manage workload domains (e.g., expand the first workload domain 154, transfer virtual resources of the second workload domain 156 to the virtual rack, etc.) to execute an application specified by a user. In the illustrated example, the NRM 158 assembles an example nested rack (R4') 160 based on available ones of the physical hardware resources 140, 142, 144 and deploys the nested rack 160 within the second physical rack 104.

In the illustrated example of FIG. 1, the nested rack 160 is an SDDC container (e.g., the nested rack 160 is virtual and not physical) that corresponds to a nested virtual server rack. For example, while the physical racks 102, 104, 106 have physical hardware (e.g., the physical hardware resources 140, 142, 144), the nested rack 160 does not have physical hardware and is instead nested and/or otherwise virtually embedded within the second physical rack 104 by assuming control of unused ones of the second physical hardware resources 142. Additionally or alternatively, the NRM 158 may generate the nested rack 160 to span more than one of the physical racks 102, 104, 106. For example, the NRM 158 may generate a nested rack that includes one or more of the hosts of the first physical rack 102 and one or more hosts of the second physical rack 104.

The nested rack 160 of FIG. 1 includes the second server host nodes(0-7) 126. In the illustrated example, a portion or an entirety of the second physical hardware resources 142 are allocated to the nested rack 160. For example, an entirety of (1) the second physical hardware resources 142 of the second server host nodes(0-2) 126 and the second server host nodes(5-7) 126 and (2) unused ones of the second physical hardware resources 142 of the second server host nodes(3-4) 126 are allocated to the nested rack 160. Additionally or alternatively, the nested rack 160 may span more than one rack (e.g., may include physical resources from the first physical rack 102, the second physical rack 104, or physical resources from a physical rack that is communicatively coupled to the physical racks 102, 104 via a network, etc.).

In some examples, the NRM 158 builds the nested rack 160 in lieu of obtaining and integrating a new physical rack into the virtual server rack 108. Instead of obtaining a new physical rack, the NRM 158 may generate a virtual rack that can be controlled, managed, etc., like a physical rack using unused ones of the physical hardware resources 140, 142, 144. For example, a maintenance activity, operation, or task is to be executed on one or more of the third server host nodes 136 that facilitate operation of the second workload domain 156. The third server host nodes 136 may include ones of the third physical hardware resources 144 that have a first hardware version (e.g., hardware version A) that are to be upgraded to a second hardware version (e.g., hardware version B). Additionally or alternatively, the ones of the third physical hardware resources 144 may have firmware and/or software that is to be upgraded.

In prior implementations, a new physical rack (e.g., loaner hosts) and spare storage resources are obtained and deployed to the virtual server rack 108. Data associated with VMs, containers, etc., executing on the third server host nodes(0-1) 136 are copied to the spare storage resources and then live migrated to physical resources of the new physical rack. In other prior implementations, the virtual server rack 108 is taken offline to perform such a migration that causes undesired downtime and cost. After the live migration, the third physical rack 106 is decommissioned and, in some instances, physically destroyed to prevent data theft. As used herein, the term "live migration" refers to migrating one or more virtual resources (e.g., a container, a VM, etc.) that are executing on a first host to a second host while the one or more virtual resources are executing on the first host.

To prevent unwanted downtime and/or to avoid incurring costs associated with obtaining loaner hosts, spare storage space, etc., the NRM 158 can generate the nested rack 160 to live migrate VMs, containers, etc., expand a workload domain such as the first workload domain 154, etc. In some examples, the NRM 158 generates the nested rack 160 to live migrate VMs, containers, etc., executing on the third server host nodes(0-1) 136 to ones of the second physical hardware resources 142 allocated to the nested rack 160.

In the illustrated example of FIG. 1, the NRM 158 generates the nested rack 160 by discovering and/or otherwise identifying available physical resources associated with the first physical rack 102 and the second physical rack 104 that can be allocated to the nested rack 160. In some examples, the NRM 158 identifies candidate resources (e.g., candidate physical hardware resources) for allocation to the nested rack 160 based on a nested resource policy. In some examples, the nested resource policy indicates an architectural level of resources from which to generate a nested rack. For example, the nested resource policy may specify to obtain resources at the virtual environment level by identifying the first physical rack 102, the second physical rack 104, and the third physical rack 106 from which to obtain physical resources to generate the nested rack 160. In other examples, the nested resource policy can specify to obtain resources at the physical rack level by identifying one or more hosts of the first physical rack 102, one or more hosts of the second physical rack 104, and/or one or more hosts of the third physical rack 106 to obtain physical resources from to generate the nested rack 160.

The NRM 158 of FIG. 1 manages and/or otherwise facilitates operation of the nested rack 160 by installing and/or otherwise deploying example nested hypervisors 162. In FIG. 1, the nested hypervisors 162 are deployed on hypervisors of respective ones of the second server host nodes(6-7) 126. For example, the second server host node(6) 126 may have a first hypervisor installed that manages the association of (1) the second physical hardware resources 142 of the second server host node(6) 126 with (2) the virtual server rack 108. In such examples, the NRM 158 can install a second hypervisor to be nested, included in, or operating on top of the first hypervisor. The second hypervisor may manage the association of (1) the second physical hardware resources 142 of the second server host node(6) 126 with (2) the nested rack 160. For example, the nested rack 160 may execute one or more computing tasks by instructing, with the second hypervisor, the first hypervisor to execute the one or more computing tasks, and instructing, with the first hypervisor, one or more of the second physical hardware resources 142 to execute the one or more computing tasks. Advantageously, such nesting or layering of hypervisors enables a virtual server rack to be generated using existing available resources. For example, instead of physically moving or re-allocating the available resources into a new physical rack or obtaining a loaner physical rack, the virtual server rack can be generated and, thus, establish control or management of the available resources by adding an additional management layer (e.g., the nested hypervisors 162) on the existing available resources.

Figure 2:
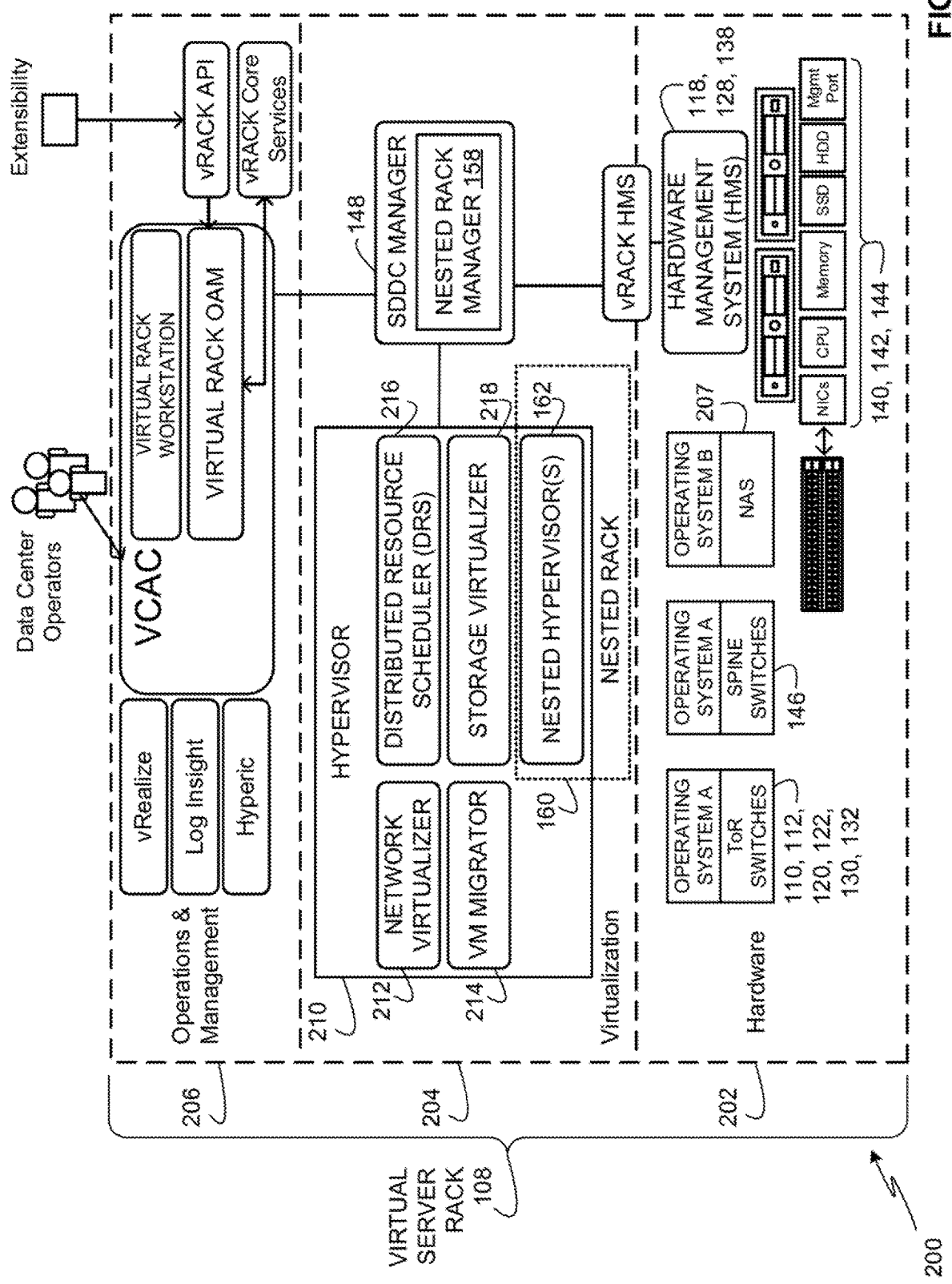
FIG. 2 illustrates an example architecture including the example nested rack manager of FIG. 1 to configure and deploy the example nested rack of FIG. 1.

FIG. 2 depicts an example virtual server rack architecture 200 that may be used to configure and deploy the virtual server rack 108 of FIG. 1 including the nested rack 160 of FIG. 1. The example architecture 200 of FIG. 2 includes an example hardware layer 202, an example virtualization layer 204, and an example operations and management (OAM) layer 206. In the illustrated example, the hardware layer 202, the virtualization layer 204, and the OAM layer 206 are part of the example virtual server rack 108 of FIG. 1. The virtual server rack 108 of the illustrated example is based on the physical racks 102, 104, 106 of FIG. 1. The virtual server rack 108 configures the physical hardware resources 140, 142, 144, virtualizes the physical hardware resources 140, 142, 144 into virtual resources, provisions virtual resources for use in providing cloud-based services, and maintains the physical hardware resources 140, 142, 144 and the virtual resources. The nested rack 160 of the illustrated example is based on the virtual resources virtualized by the virtual server rack 108. Accordingly, the nested rack 160 is included in the virtualization layer 204 and interacts with the hardware layer 202 and/or the OAM layer 206 via the nested hypervisors 162 included in, operating on top of, and/or otherwise in communication with an example hypervisor 210 as further described below.

The hardware layer 202 of FIG. 2 includes the HMS 118, 128, 138 of FIG. 1 that interfaces with the physical hardware resources 140, 142, 144 (e.g., processors, NICs, servers, switches, storage devices, peripherals, power supplies, etc.), the ToR switches 110, 112, 120, 122, 130, 132 of FIG. 1, the spine switches 146 of FIG. 1, and example network attached storage (NAS) hardware 207. The NAS hardware 207 of the illustrated example represents external storage resources communicatively coupled to the physical racks 102, 104, 106 via one or more of the spine switches 146. The HMS 118, 128, 138 is configured to manage individual hardware nodes such as different ones of the physical hardware resources 140, 142, 144. For example, managing of the hardware nodes involves discovering nodes, bootstrapping nodes, resetting nodes, processing hardware events (e.g., alarms, sensor data threshold triggers, etc.) and state changes, exposing hardware events and state changes to other resources and a stack of the virtual server rack 108 in a hardware-independent manner. The HMS 118, 128, 138 also supports rack-level boot-up sequencing of the physical hardware resources 140, 142, 144 and provides services such as secure resets, remote resets, and/or hard resets of the physical hardware resources 140, 142, 144.

In the illustrated example of FIG. 2, the virtualization layer 204 includes the hypervisor 210. The hypervisor 210 is installed and runs on server hosts in the physical hardware resources 140, 142, 144 to enable the server hosts to be partitioned into multiple logical servers to create VMs. In some examples, the hypervisor 210 may be implemented using a VMWARE ESXI™ hypervisor available as a component of a VMWARE VSPHERE® virtualization suite developed and provided by VMware, Inc. The VMWARE VSPHERE® virtualization suite is a collection of components to setup and manage a virtual infrastructure of servers, networks, and other resources.

In the illustrated example of FIG. 2, the hypervisor 210 is shown having a number of virtualization components executing thereon including the nested hypervisor(s) 162 of FIG. 1, an example network virtualizer 212, an example VM migrator 214, an example distributed resource scheduler (DRS) 216, and an example storage virtualizer 218. In the illustrated example, the SDDC manager 148 communicates with these components to manage and present the logical view of underlying resources such as hosts and clusters. The SDDC manager 148 also use the logical view for orchestration and provisioning of workloads.

The network virtualizer 212 of FIG. 2 abstracts or virtualizes network resources such as physical hardware switches (e.g., the management switches 114, 124, 134 of FIG. 1, the ToR switches 110, 112, 120, 122, 130, 132, and/or the spine switches 146, etc.) to provide software-based virtual or virtualized networks. The network virtualizer 212 enables treating physical network resources (e.g., routers, switches, etc.) as a pool of transport capacity. In some examples, the network virtualizer 212 also provides network and security services to VMs with a policy driven approach. The network virtualizer 212 includes a number of components to deploy and manage virtualized network resources across servers, switches, and clients. For example, the network virtualizer 212 includes a network virtualization manager that functions as a centralized management component of the network virtualizer 212 and runs as a virtual appliance on a server host.

In some examples, the network virtualizer 212 can be implemented using a VMWARE NSX™ network virtualization platform that includes a number of components including a VMWARE NSX™ network virtualization manager. For example, the network virtualizer 212 can include a VMware® NSX Manager™. The NSX Manager can be the centralized network management component of NSX and is installed as a virtual appliance on any ESX™ host (e.g., the hypervisor 210, etc.) in a vCenter Server environment to provide an aggregated system view for a user. For example, an NSX Manager can map to a single vCenter Server environment and one or more NSX Edge, vShield Endpoint, and NSX Data Security instances. For example, the network virtualizer 212 can generate virtualized network resources such as a logical distributed router (LDR) and/or an edge services gateway (ESG).

The VM migrator 214 of the illustrated example of FIG. 2 is provided to move or migrate (e.g., live migrate) VMs between different hosts without losing state during such migrations. For example, the VM migrator 214 allows moving an entire running VM from one physical server to another with substantially little or no downtime. The migrating VM retains its network identity and connections, which results in a substantially seamless migration process. The VM migrator 214 enables transferring the VM's active memory and precise execution state over a high-speed network, which allows the VM to switch from running on a source server host to running on a destination server host.

The DRS 216 of the illustrated example of FIG. 2 is provided to monitor resource utilization across resource pools, to manage resource allocations to different VMs, to deploy additional storage capacity to VM clusters with substantially little or no service disruptions, and to work with the VM migrator 214 to automatically migrate VMs during maintenance with substantially little or no service disruptions.

The storage virtualizer 218 of the illustrated example of FIG. 2 is software-defined storage for use in connection with virtualized environments. The storage virtualizer 218 clusters server-attached HDDs and SSDs to create a shared datastore for use as virtual storage resources in virtual environments. In some examples, the storage virtualizer 218 may be implemented using a VMWARE VIRTUAL SAN™ network data storage virtualization component developed and provided by VMware, Inc.

The virtualization layer 204 of the illustrated example, and its associated components are configured to run VMs. However, in other examples, the virtualization layer 204 may additionally and/or alternatively be configured to run containers. For example, the virtualization layer 204 may be used to deploy a VM as a data computer node with its own guest OS on a host using resources of the host. Additionally and/or alternatively, the virtualization layer 204 may be used to deploy a container as a data computer node that runs on top of a host OS without the need for a hypervisor or separate OS.

In the illustrated example of FIG. 2, the OAM layer 206 is an extension of a VMWARE VCLOUD® AUTOMATION CENTER™ (VCAC) that relies on the VCAC functionality and also leverages utilities such as VMWARE VCENTER™ LOG INSIGHT™, and VMWARE VCENTER™ HYPERIC® to deliver a single point of SDDC operations and management. The OAM layer 206 is configured to provide different services such as health monitoring service, capacity planner service, maintenance planner service, events and operational view service, and virtual rack application workloads manager service. In some examples, a user manages an environment and associated physical and virtual resources via the OAM layer 206.

In the illustrated example of FIG. 2, the SDDC manager 148 interfaces with the hypervisor 210 of the virtualization layer 204. The SDDC manager 148 communicates with the HMS 118, 128, 138 to manage the physical hardware resources 140, 142, 144. The SDDC manager 148 create the virtual server rack 108 out of underlying physical hardware resources 140, 142, 144 that may span one or more physical racks (or smaller units such as a hyper-appliance or half rack) and handles physical management of those resources. The SDDC manager 148 use the virtual server rack 108 as a basis of aggregation to create and provide operational views, handle fault domains, and scale to accommodate workload profiles. The SDDC manager 148, including the NRM 158, keep track of available capacity in the virtual server rack 108, maintain a view of a logical pool of virtual resources throughout the SDDC life-cycle, and translate logical resource provisioning to allocation of physical hardware resources 140, 142, 144.

In the illustrated example of FIG. 2, the SDDC manager 148 includes the NRM 158 to improve flexibility of allocating ones of the physical hardware resources 140, 142, 144 to generate the nested rack 160 of FIG. 1. For example, the NRM 158 may re-allocate virtual resources that correspond to ones of the physical hardware resources 140, 142, 144 to assemble the nested rack 160. Advantageously, by re-allocating the virtual resources, the nested rack 160 can be assembled without adding another physical rack and integrating the added physical rack into the virtual server rack 108. For example, from the perspective of a user, the nested rack 160 may appear to the user and/or the user may interact with the nested rack 160 as if the nested rack 160 is another physical rack. In such examples, even though the nested rack 160 may not have physical hardware resources, the nested rack 160 re-allocates virtual resources that correspond to unused and/or underutilized ones of the physical hardware resources 140, 142, 144 for use by the nested rack 160.

In the illustrated example of FIG. 2, the NRM 158 deploys one or more of the nested hypervisors 162 on the hypervisor 210 to manage the nested rack 160. For example, the hypervisor 210 may be deployed on respective ones of the second server host nodes(0-7) 126 of FIG. 1. The network virtualizer 212, the storage virtualizer 218, etc., of the hypervisor 210 may virtualize the second physical hardware resources 142 of the respective ones of the second server host nodes(0-7) 126. The nested hypervisors 162 may be deployed on respective ones of the second server host nodes(6-7) 126. In such examples, a first one of the nested hypervisors 162 deployed on the second server host node(6) 126 may access the underlying second physical hardware resources 142 of the second server host node(6) 126 via the hypervisor 210 on the second server host node(6) 126.

The NRM 158 can build the nested rack 160 by deploying the nested hypervisors 162 on corresponding ones of the second server host nodes 126 that have been identified as unused, underutilized, etc., and/or otherwise available to be allocated for nested rack creation. Accordingly, a user may execute a workload on the nested rack 160 in the same manner as executing a workload on the virtual server rack 108 by interacting with the nested hypervisors 162 which, in turn, interact with corresponding ones of the hypervisor 210 which, in turn, interact with underlying ones of the second physical hardware resources 142.

Example components of FIG. 2 may be implemented using products developed and provided by VMware, Inc. Alternatively, some or all of such components may alternatively be supplied by components with the same and/or similar features developed and/or provided by other virtualization component developers.

Figure 3:
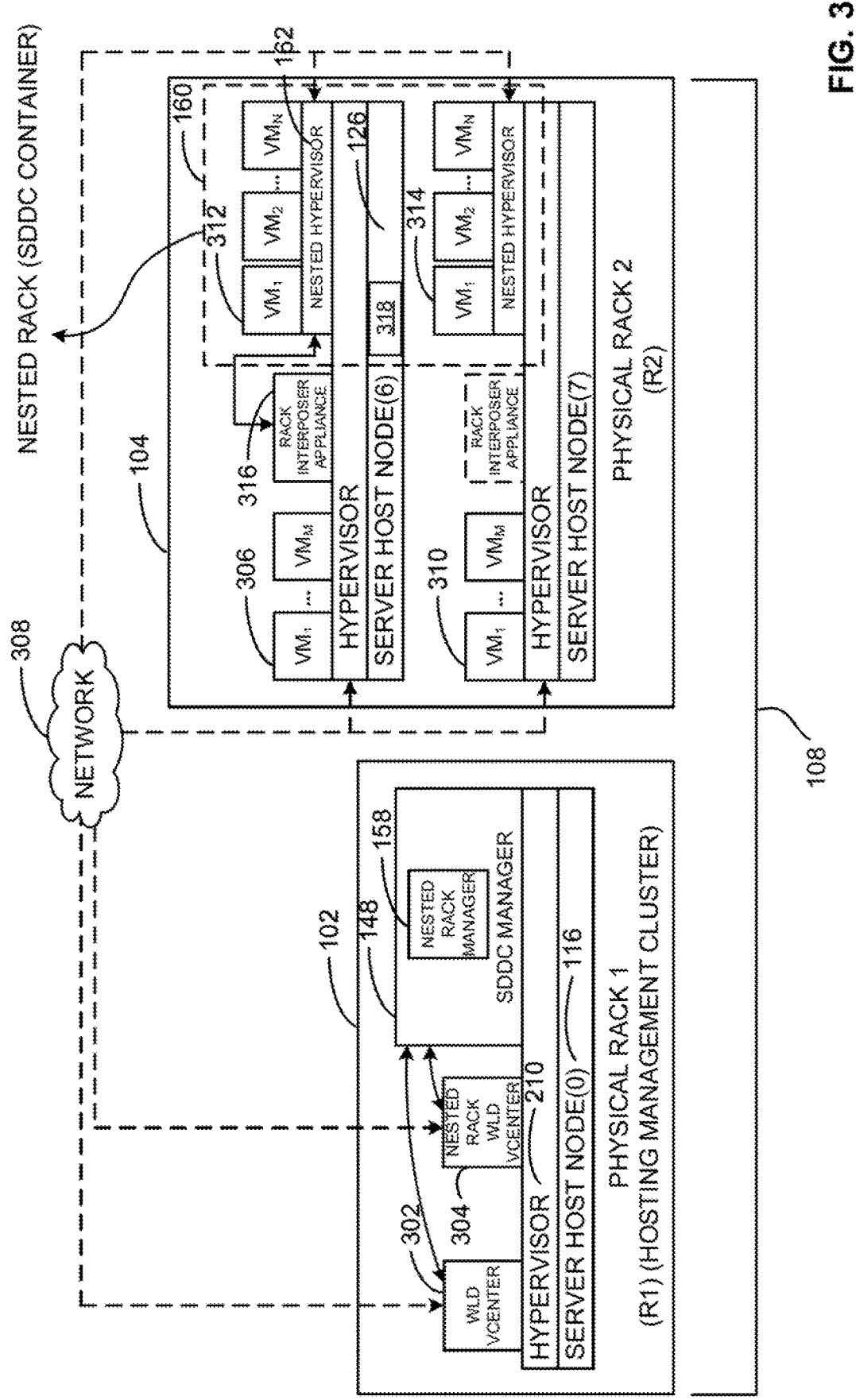
FIG. 3 illustrates the example architecture of FIG. 2 including the example nested rack manager of FIGS. 1-2 to configure and deploy an example rack interposer in the example virtual server rack deployment of FIG. 1.

FIG. 3 is a schematic illustration of the virtual server rack 108 of FIGS. 1-2 including the NRM 158 of FIGS. 1-2 to configure and deploy the nested rack 160 of FIGS. 1-2. In the illustrated example of FIG. 3, the first physical rack 102 is a primary rack (e.g., a hosting management cluster). The SDDC manager 148 includes the NRM 158 to generate and manage the nested rack 160 deployed on the second physical rack 104.

In the illustrated example of FIG. 3, one or more example workload domain (WLD) vCenter Servers 302 and an example nested rack WLD vCenter Server 304 are deployed on the hypervisor 210 of the first server host node(0) 116. The one or more WLD vCenter Servers 302 and the nested rack WLD vCenter Server 304 can be managed (e.g., by a user, a computing device, etc.) in a vCenter Server environment to provide an aggregated system view for a user. For example, the one or more WLD vCenter Servers 302 may include a first one of the WLD vCenter Servers 302 that corresponds to the first workload domain 154 of FIG. 1 and a second one of the WLD vCenter Servers 304 that corresponds to the second workload domain 156 of FIG. 1. In FIG. 3, the nested rack WLD vCenter Server 304 corresponds to the nested rack 160.

In the illustrated example of FIG. 3, the first one of the WLD vCenter Servers 302 facilitates operation of first example VMs 306 executing on the second server host node(0) 126 via an example network 308. The network 308 of the illustrated example of FIG. 3 is the Internet. However, the network 308 can be implemented using any suitable wired and/or wireless network(s) including, for example, one or more data buses, one or more Local Area Networks (LANs), one or more wireless LANs, one or more cellular networks, one or more private networks, one or more public networks, etc.

In the illustrated example of FIG. 3, the second one of the WLD vCenter Servers 302 facilitates operation of second example VMs 310 executing on the second server host node(1) 126 via the network 308. In FIG. 3, the nested rack WLD vCenter Server 304 facilitates operation of third example VMs 312 executing on the second server host node(0) 126 and fourth example VMs 314 executing on the second server host node(1) 126. Additionally or alternatively, the nested rack WLD vCenter Server 304 may facilitate operation of one or more containers on at least one of the second server host node(0) 126 or the second server host node(1) 126.

In the example of live migrating VMs of the second workload domain 156, the NRM 158 can generate the nested rack 160 as depicted in FIG. 3 to facilitate the live migration. For example, the NRM 158 may identify available ones of the second physical hardware resources 142 that could be allocated for nested rack generation. In FIG. 3, the NRM 158 may identify the second server host node(6) 126 and the second server host node(7) 126 as having candidate physical hardware resources for allocation. In response to identifying the candidate physical hardware resources, the NRM 158 may deploy an instance of the nested hypervisor 162 on the second server host node(6) 126 and the second server host node(7) 126. The NRM 158 may copy and/or otherwise migrate the VMs of the second workload domain 156 (e.g., the third and fourth VMs 312, 314) to the nested hypervisors 162. If the live migration is successful, the NRM 158 may determine whether to decommission the nested rack 160. For example, the NRM 158 may determine that a hardware, firmware, and/or software upgrade associated with the third physical hardware resources 144 have been completed. In such examples, the NRM 158 can live migrate the third and fourth VMs 312, 314 back to the third physical hardware resources 144 and de-allocate the physical hardware resources allocated to the nested rack 160 back to the pool of available physical hardware resources (e.g., an available resource pool).

In some examples, ones of the physical hardware resources 140, 142, 144 are non-nesting devices that do not support hypervisor nesting (e.g., executing an instruction passed through two or more hypervisors). As used herein, the term "hypervisor nesting" refers to a first hypervisor (e.g., the nested hypervisors 162) installed on, included in, and/or otherwise operating on top of a second hypervisor (e.g., the hypervisor 210). For example, certain GPUs, universal serial bus (USB) devices and peripherals, etc., may not support multiple pass-throughs or redirections and, thus, are unreachable by the nested hypervisors 162. To support such non-nesting devices, an example rack interposer appliance 316 can be deployed to the hypervisor 210 that interfaces with an example non-nesting device 318. In FIG. 3, the rack interposer appliance 316 is software. For example, the rack interposer appliance 316 may act like a data tunnel between the nested rack 160 and the second physical rack 104 to which the non-nesting device 318 is associated with. In such examples, the rack interposer appliance 316 can act like a data tunnel by re-directing data from a VM to the non-nesting device 318 instead of through the nested hypervisor 162. In FIG. 3, the non-nesting device 318 is a USB device that does not support hypervisor nesting. Alternatively, the non-nesting device 318 may be a GPU or any other physical hardware resource that does not support hypervisor nesting.

In the illustrated example of FIG. 3, the rack interposer appliance 316 provides access to the second physical hardware resources 142 of the second server host node(6) 126 to the third VMs 312, the fourth VMs 314, etc., on the nested hypervisors 162 that would otherwise not be accessible via the nested hypervisors 162. Prior to the rack interposer appliance 316, the non-nesting device 318 may crash, malfunction, or stop working when one of the third VMs 312, the fourth VMs 314, etc., on the nested hypervisors 162 attempted to access the non-nesting device 318.

In the illustrated example of FIG. 3, the NRM 158 installs and/or otherwise deploys one or more function call intercepting libraries (e.g., a software library included in a vSphere Installation Bundle (VIB)) on the nested hypervisor 162 of the second server host node(6) 126. For example, one or more software libraries included in one or more VIBs may intercept a function call made by a first one of the third VMs 312 to the nested hypervisor 162 of the second server host node(6) 126. In such examples, the function call can be directed to the non-nesting device 318 associated with the second server host node(6) 126. For example, the nested hypervisor 162 may not receive the function call as it is redirected to the rack interposer appliance 316 which, in turn, redirects the function call to the hypervisor 210 of the second server host node(6) 126. In such examples, the one or more VIBs may forward the function call from the first one of the third VMs 312 to the hypervisor 210 of the second server host node(6) 126.

In operation, the one or more function call intercepting libraries associated with the rack interposer appliance 316 may (1) obtain a message (e.g., one or more data packets) from the first one of the third virtual machines 312 on the first one of the nested hypervisors 162 directed to the hypervisor 210 on the second server host node(6) 126, and (2) transmit the message to the hypervisor 210 instead of the first one of nested hypervisors 162. Advantageously, the rack interposer appliance 316 may ensure that the function call is directed from the first one of the third VMs 312 to the hypervisor 210 without being processed by the first one of the nested hypervisors 162 that may crash the non-nesting device 318.

In some examples, the rack interposer appliance 316 is used to generate pre-emptible VMs, containers, etc., that use the non-nesting device 318. For example, a user may desire to use the non-nesting device 318 for a short duration to reduce extra resource allocation charge or time-slice charges, prevent throttling of resources, etc. In such examples, the NRM 158 can configure the rack interposer appliance 316 to accept function call transfers to execute workloads by the non-nesting device 318 and reject function call transfers after the workloads are complete. For example, function calls from the first one of the third VMs 312 are rejected by the rack interposer appliance 316 after the non-nesting device 318 completes a requested workload. In such examples, the NRM 158 can release the non-nesting device 318 and migrate a virtualization of the non-nesting device 318 to another server host node.

Figure 4:
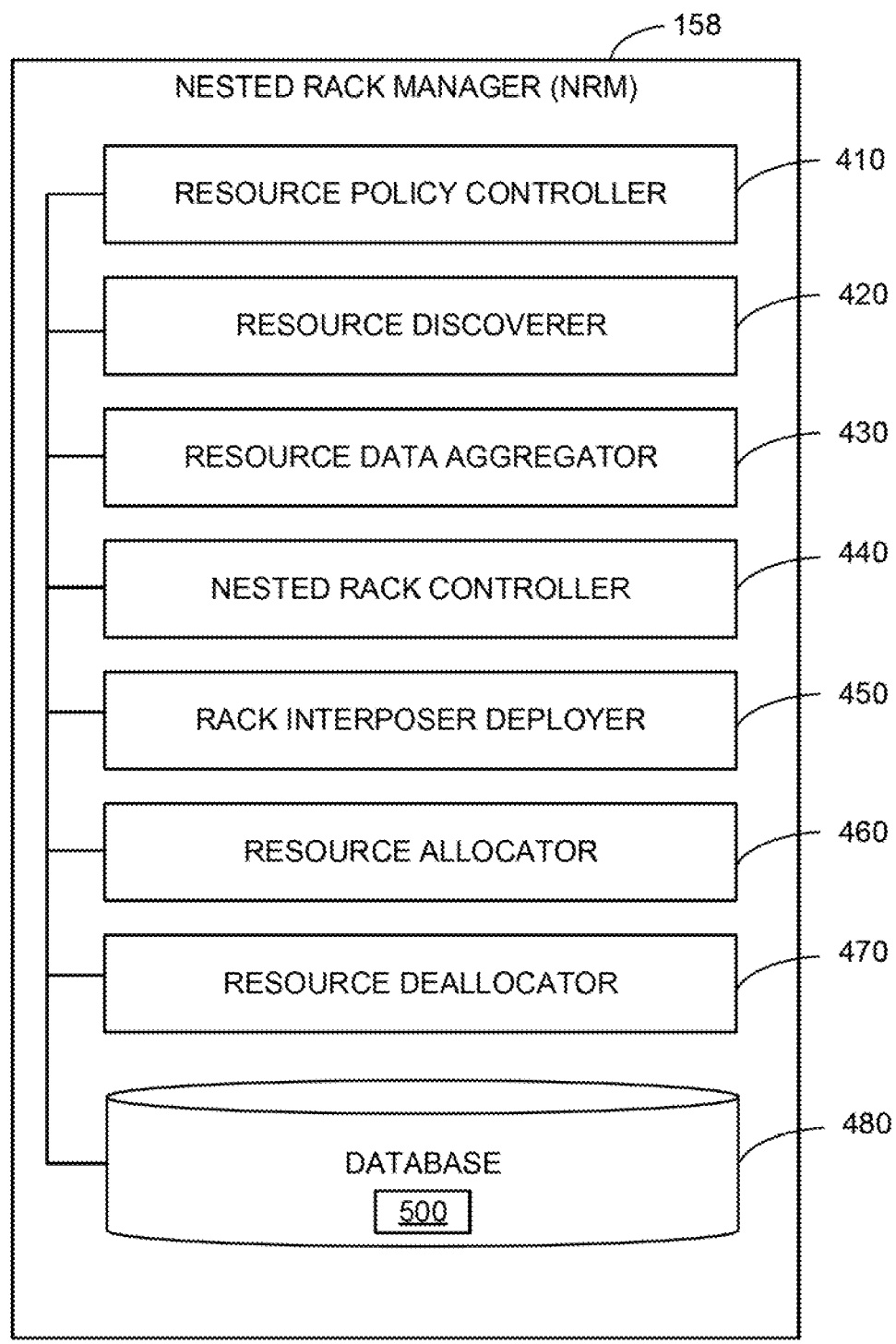
FIG. 4 is a block diagram of an example implementation of the example nested rack manager of FIGS. 1-3.

FIG. 4 is a block diagram of an example implementation of the NRM 158 of FIGS. 1-3. The NRM 158 of the illustrated example of FIG. 4 includes an example resource policy controller 410, an example resource discoverer 420, an example resource data aggregator 430, an example nested rack controller 440, an example rack interposer deployer 450, an example resource allocator 460, an example resource deallocator 470, and an example database 480.

The NRM 158 of the illustrated example of FIG. 4 includes the resource policy controller 410 to obtain or generate resource policies that facilitate an identification of candidate physical hardware resources to be allocated for nested rack generation. In some examples, the resource policy is a nested resource policy. For example, the resource policy controller 410 may obtain a nested resource policy from a user, the database 480, etc. In such examples, the resource policy controller 410 can obtain a nested resource policy from a user that identifies one or more of the physical racks 102, 104, 106 of FIG. 1 to obtain candidate resources for nested rack generation.

In some examples, the resource policy controller 410 determines whether physical hardware resources associated with a host, a server host node, etc., have been reserved for nested rack generation. For example, the resource policy controller 410 may determine that a nested resource policy indicates that one or more of the second physical hardware resources 142 associated with the second server host node(6) 126, the second server host node(7) 126, etc., of FIG. 1 have been reserved for generation of a nested rack. When reserved for nested rack generation, the server host node may be considered free and/or otherwise available for nested rack generation. If the resource policy controller 410 determines that the second physical hardware resources 142 associated with the second server host node(6) 126, the second server host node(7) 126, etc., have been reserved for nested rack generation, the resource policy controller 410 may identify the reserved physical hardware resources as candidate physical hardware resources.

In other examples, the resource policy controller 410 can determine whether candidate physical hardware resources are to be identified at a physical rack level (e.g., from the perspective of the physical racks 102, 104, 106 of FIG. 1). For example, the resource policy controller 410 may select the second physical rack 104 to process and identify candidate physical hardware resources associated with the second physical rack 104. In yet other examples, the resource policy controller 410 can determine whether candidate physical hardware resources are to be identified at a virtual environment or virtual server rack level. For example, the resource policy controller 410 may identify ones of the physical hardware resources 140, 142, 144 associated with at least one of the first physical rack 102, the second physical rack 104, or the third physical rack 106 of the virtual rack 108 as candidate physical hardware resources for nested rack generation.

In some examples, the resource policy controller 410 implements means for generating nested resource policies from which ones of candidate physical hardware resources can be selected to assemble, configure, and deploy a nested rack such as the nested rack 160 of FIGS. 1-3. In some examples, the generating means obtains requirements from a user corresponding to a quantity of resources (e.g., accelerator, compute, network, security, storage, etc., resources) on one or more hosts on one or more of the physical racks 102, 104, 106. In some examples, the generating means generates a nested resource policy based on the quantity of resources indicated by the requirements. In some examples, the generating means selects a server host node and/or a physical rack of interest to process. In such examples, the generating means identifies unused or underutilized resources (e.g., available or spare resources) as candidate resources that can be used for nested rack generation. The generating means can generate a nested rack policy indicative of the identified candidate resources that can be used for generating the nested rack 160 of FIGS. 1-3.

Figure 6:
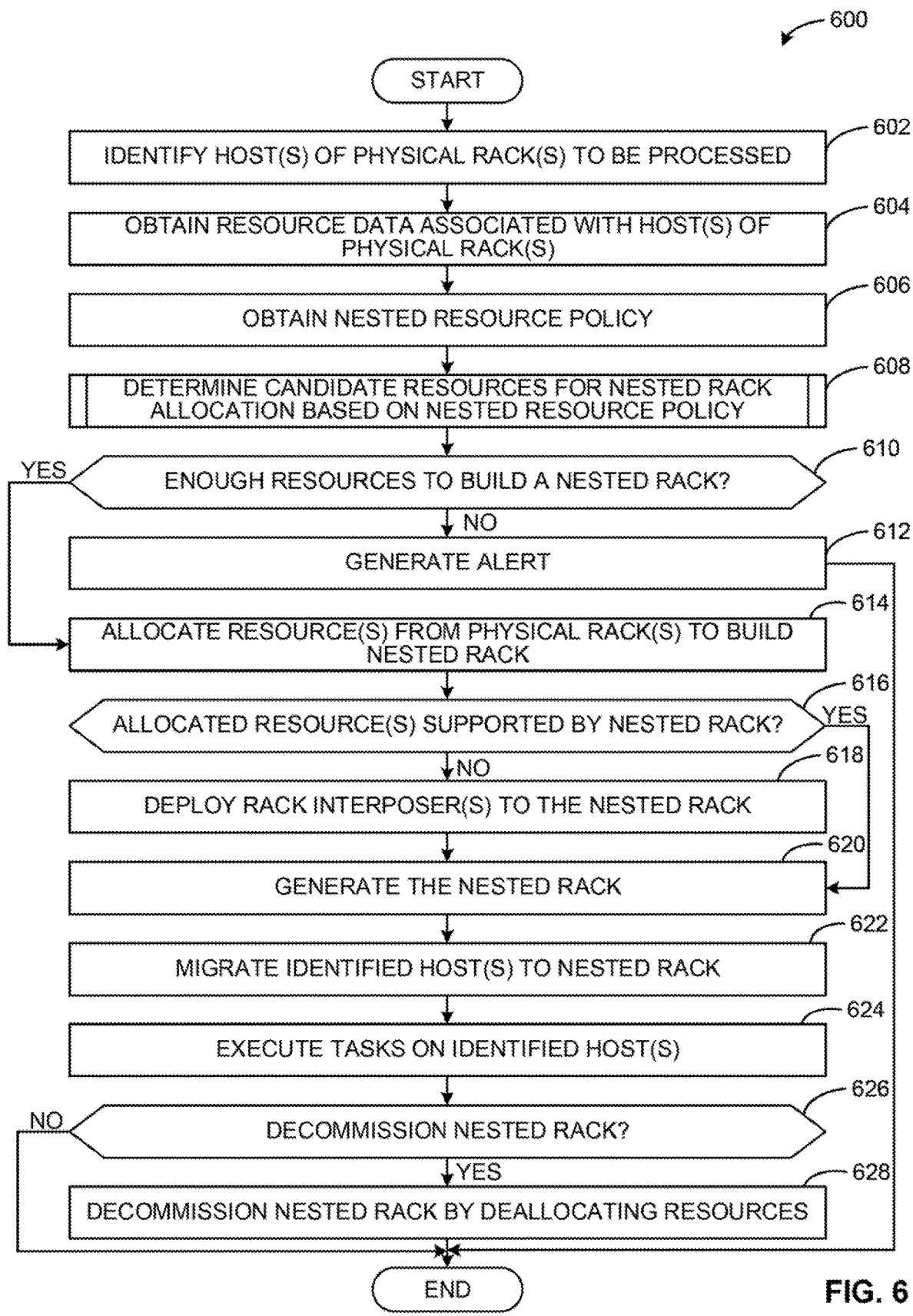
FIG. 6 is a flowchart representative of example machine readable instructions which may be executed to implement the example nested rack manager of FIGS. 1-4 to deploy the example nested rack of FIGS. 1 and 3.
Figure 7:
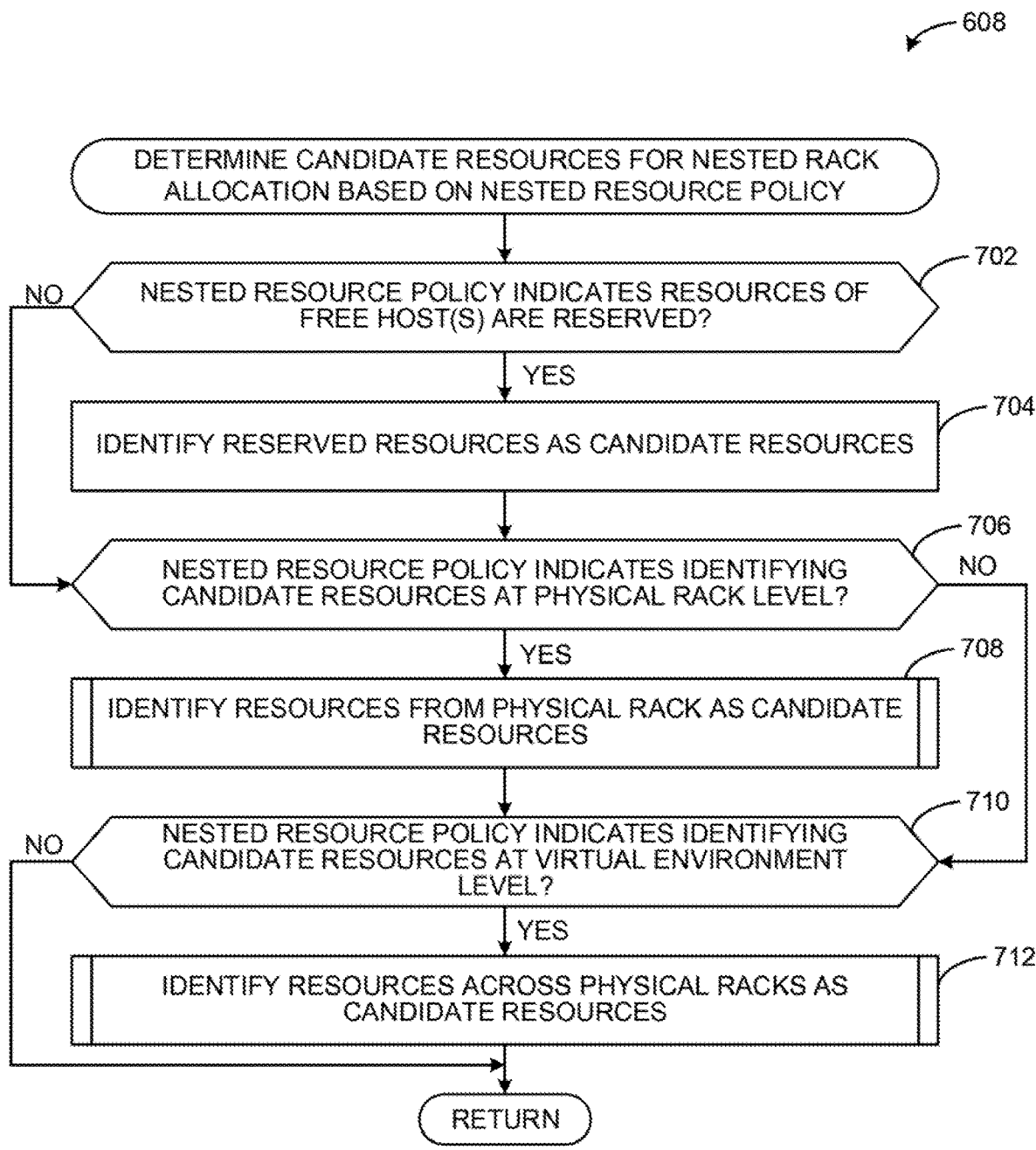
FIG. 7 is a flowchart representative of example machine readable instructions which may be executed to implement the example nested rack manager of FIGS. 1-4 to determine example candidate resources for allocation based on an example nested resource policy.
Figure 10:
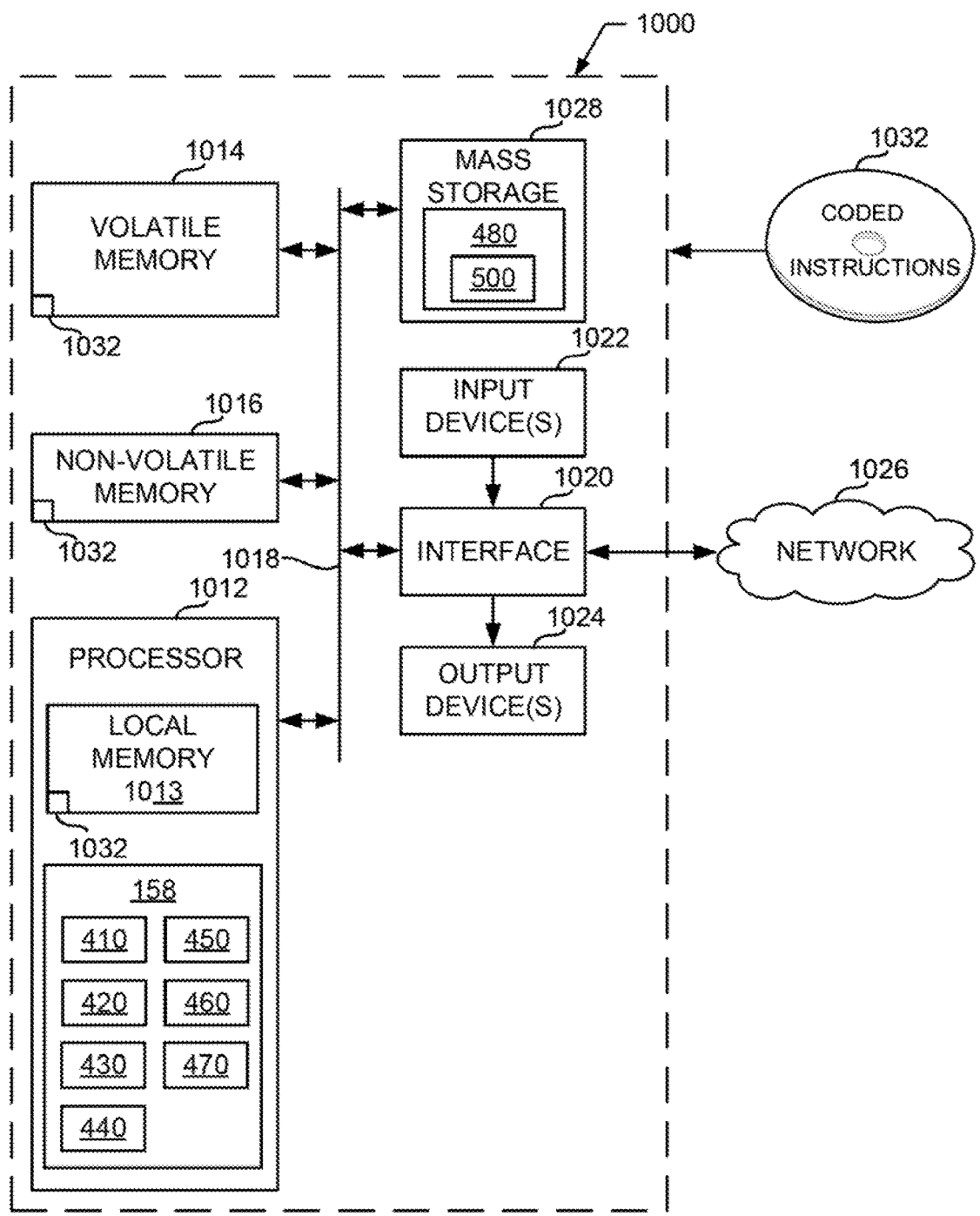
FIG. 10 is a block diagram of an example processing platform structured to execute the example machine readable instructions of FIGS. 6-9 to implement the example nested rack manager of FIGS. 1-4.

In some examples, the generating means is implemented by executable instructions such as that implemented by at least blocks 606 and 608 of FIG. 6 and blocks 702, 704, 706, and 710 of FIG. 7, which may be executed on at least one processor such as the example processor 1012 shown in the example of FIG. 10. In other examples, the generating means is implemented by hardware logic, hardware implemented state machines, logic circuitry, and/or any other combination of hardware, software, and/or firmware.

The NRM 158 of the illustrated example of FIG. 4 includes the resource discoverer 420 to identify a physical hardware resource as a candidate physical hardware resource to facilitate generation of the nested rack 160. For example, the resource discoverer 420 may select (e.g., iteratively select) ones of the physical hardware resources 140, 142, 144, ones of the server host nodes 116, 126, 136, and/or ones of the physical racks 102, 104, 106 of FIG. 1 to process to identify candidate resources to be used for nested rack generation.

In some examples, the resource discoverer 420 identifies resources from physical racks as candidate resources. For example, the resource discoverer 420 may identify the second server host node(6) 126 as a candidate physical hardware resource because the second server host node(6) 126 is not allocated to a workload domain (e.g., the second server host node(6) 126 is a free or available resource). In other examples, the resource discoverer 420 can identify the second server host node(6) 126 as a candidate resource because the second physical hardware resources 142 of the second server host node(6) 126 are unused or underutilized.

In some examples, a resource (e.g., a physical hardware resource) may be unused when not allocated to a workload domain. In other examples, the resource may be unused when not utilized by a workload domain even if a server host node including the resource is allocated to the workload domain. In some examples, a resource is determined to be underutilized or unutilized based on a utilization parameter. In some examples, the utilization parameter corresponds to and/or is otherwise based on a portion or a subset of the resource being utilized to execute a computing task. For example, a value of 10% for the utilization parameter of a network resource may correspond to 10% of the network resource being utilized to execute a computing task.

In some examples, a resource is underutilized when allocated to a workload domain but a significant portion of the resource is not being utilized as indicated by a value of a utilization parameter. For example, a compute resource allocated to the second workload domain 156 may be underutilized when a utilization parameter of 10% indicates that 10% of the compute resource is utilized. In such examples, when the utilization parameter associated with the resource is below a utilization threshold (e.g., 15%, 20%, 30%, etc.), the resource discoverer 420 may identify the resource as underutilized. In some examples, the utilization parameter is averaged over a threshold time period (e.g., an hour, a day, a week, etc.).

In some examples, the utilization threshold is indicative of one or more resources being utilized in an inefficient manner, and the workload being executed by the one or more resources may be transferred to other resources. When determined to be underutilized, the resources may be identifiable by the resource discoverer 420 as candidate resources for nested rack generation to cause the resources to be more efficiently allocated for processing of computing tasks. In such examples, the resource discoverer 420 may identify the workloads executing the underutilized resources for re-allocation to other resources and, thus, freeing the underutilized resources for nested rack generation.

In some examples, the resource discoverer 420 identifies a physical rack as a candidate physical rack from which resources can be identified and/or obtained for nested rack generation. For example, data or information included in capacity parameters may be determined for one or more of the physical racks 102, 104, 106. In some examples, a capacity parameter can include data, information, one or more parameter values, etc., that corresponds to one or more quantities (e.g., one or more total quantities of resources, an aggregate total of the one or more total quantities of resources, etc.) of physical hardware resources that are currently available. For example, the capacity parameter may indicate a total capacity of resources (e.g., resources of a server host node) that is available for the nested rack manager 158, and/or, more generally, the SDDC manager 148 to use for allocation for workload domain creation or expansion. For example, the second server host node(6) 126 may have a capacity parameter indicative of and/or otherwise including information corresponding to a CPU capacity of 2.4 GHz, a memory capacity of 512 GB, and/or a hybrid storage capacity of 10 terabytes (TB), where the individual capacities may correspond to an aggregate capacity (e.g., a maximum aggregate capacity) that can be considered as available for use by the nested rack manager 158. In other examples, the second server host node(6) 126 may have a capacity parameter including one or more parameter values such as a CPU capacity parameter value of 2.4 GHz, a memory capacity parameter value of 512 GB, and/or a hybrid storage capacity parameter value of 10 terabytes (TB). In such examples, the second server host node(6) 126 can be identified (e.g., by the SDDC manager 148, in a graphic user interface displayed to a user, etc.) as a candidate for nested rack generation based on at least one of information included in the capacity parameter or the utilization parameter.

In some examples, the resource discoverer 420 identifies resources across physical racks as candidate resources. For example, the resource discoverer 420 may determine one or more hosts from one or more physical racks of the virtual server rack 108 based on utilization parameters, capacity parameters, etc. In some examples, the resource discoverer 420 identifies one or more of the physical hardware resources 140, 142, 144 based on the corresponding utilization parameters. For example, the resource discoverer 420 may identify ones of the physical hardware resources 140, 142, 144 that have the lowest utilization parameters (e.g., 0%, 10%, etc.) as candidate resources. In some examples, the resource discoverer 420 identifies one or more of the server host nodes 116, 126, 136 as candidate resources based on the corresponding capacity parameters. For example, the resource discoverer 420 may identify ones of the server host nodes 116, 126, 136 that have the highest capacity parameters as candidate resources. In such examples, the highest capacity parameters can correspond to having the highest aggregate capacity or highest aggregate quantity of available resources.

In some examples, the resource discoverer 420 implements means for identifying candidate resources for nested rack generation. In some examples, the identifying means identifies a resource to be processed. For example, the identifying means may identify the first physical rack 102 to be processed, the first server host node(0) 116 to be processed, a first one of the first physical hardware resources 140 to be processed, etc. In some examples, the identifying means identifies reserved resources as candidate resources when the resources are reserved for nested rack generation as specified by a nested resource policy. In some examples, the identifying means identifies resources from a physical rack as candidate resources. In some examples, the identifying means identifies resources spanning multiple physical racks as candidate resources.

Figure 8:
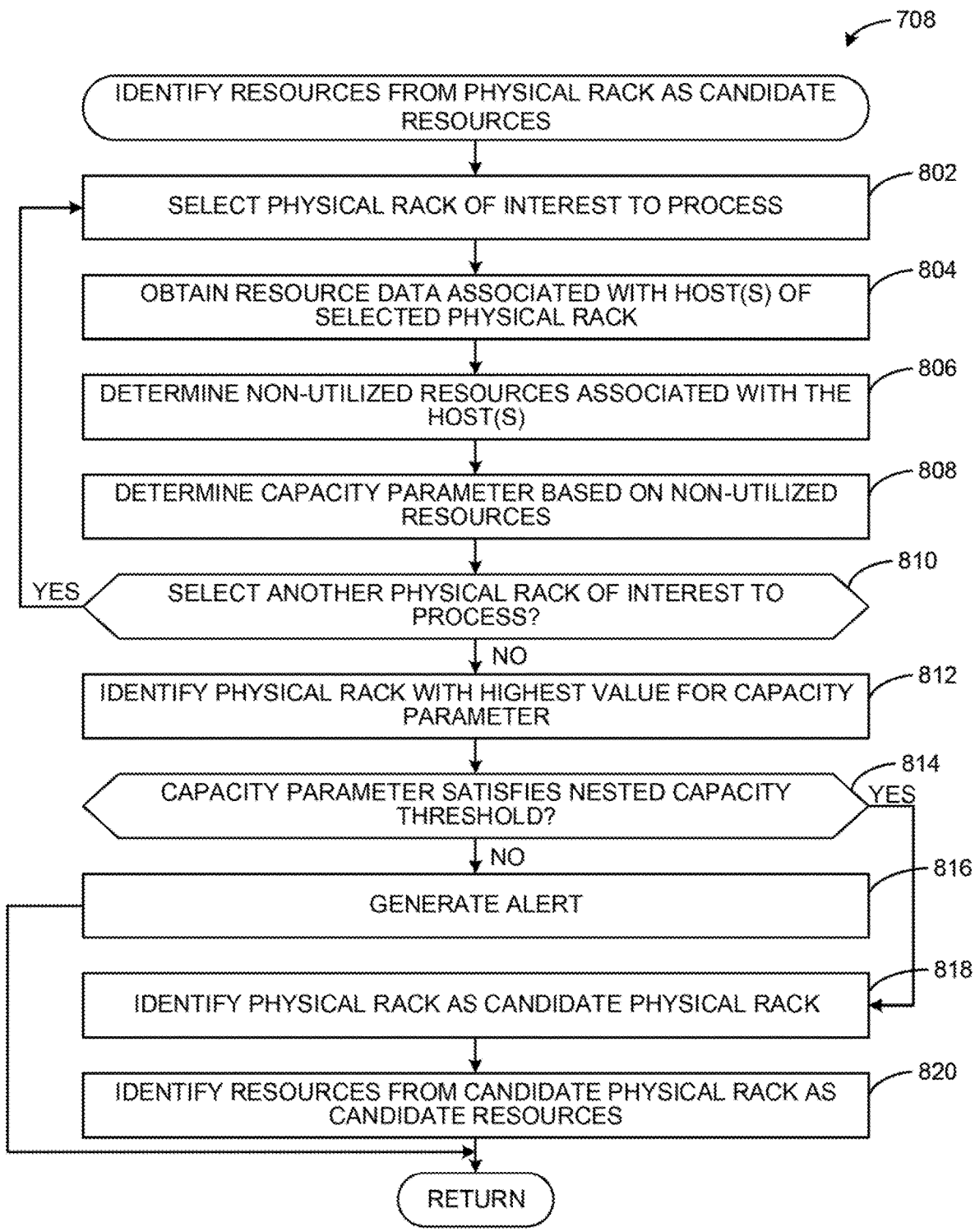
FIG. 8 is a flowchart representative of example machine readable instructions which may be executed to implement the example nested rack manager of FIGS. 1-4 to identify example resources from the example physical racks of FIG. 1 as candidate resources.
Figure 9:
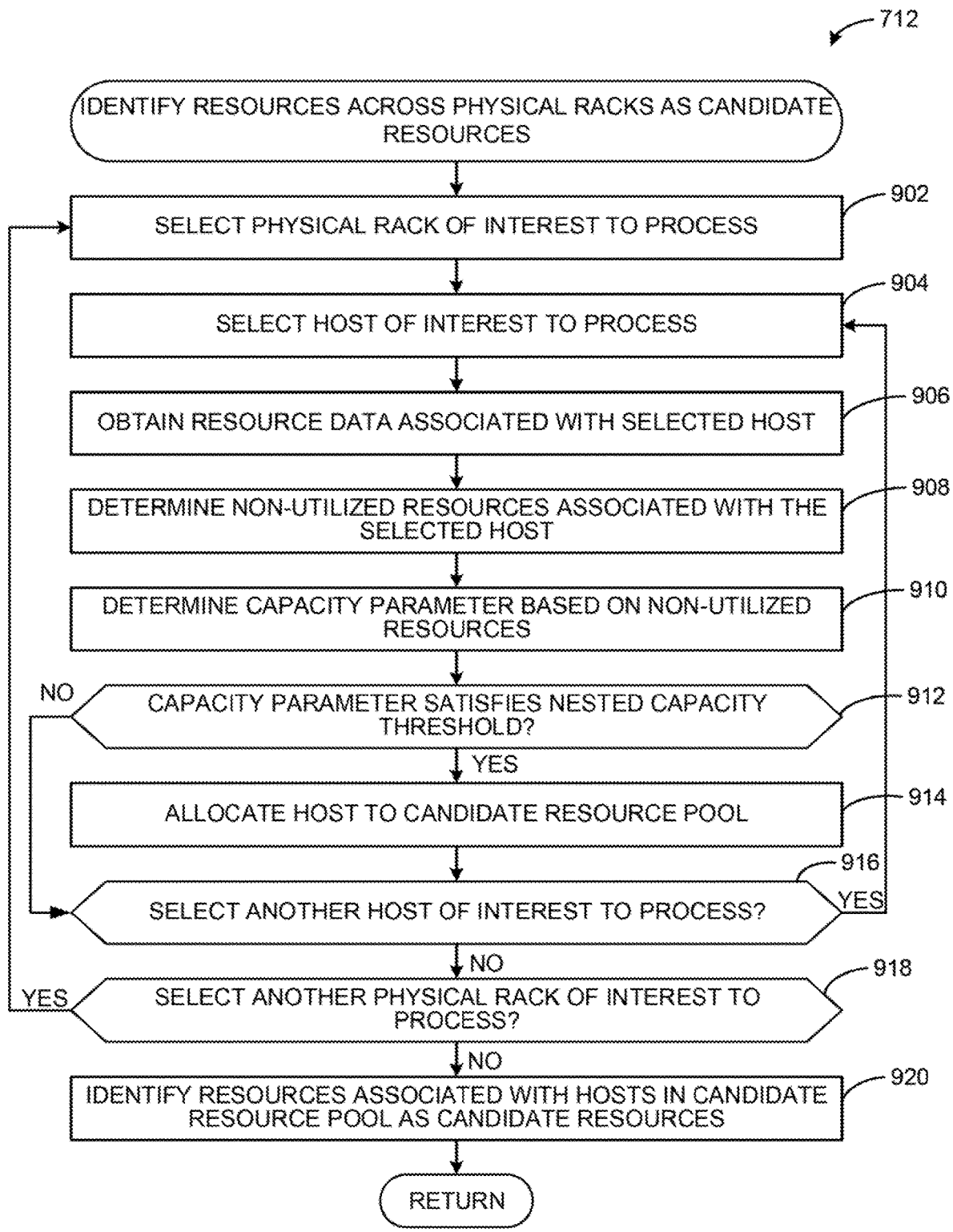
FIG. 9 is a flowchart representative of example machine readable instructions which may be executed to implement the example nested rack manager of FIGS. 1-4 to identify example resources across the example physical racks of FIG. 1 as candidate resources.

In some examples, the identifying means is implemented by executable instructions such as that implemented by at least block 602 of FIG. 6, blocks 708 and 712 of FIG. 7, blocks 802, 810, 818, and 820 of FIG. 8, and blocks 902, 904, 916, 918, and 920 of FIG. 9, which may be executed on at least one processor such as the example processor 1012 shown in the example of FIG. 10. In other examples, the identifying means is implemented by hardware logic, hardware implemented state machines, logic circuitry, and/or any other combination of hardware, software, and/or firmware.

Figure 5:
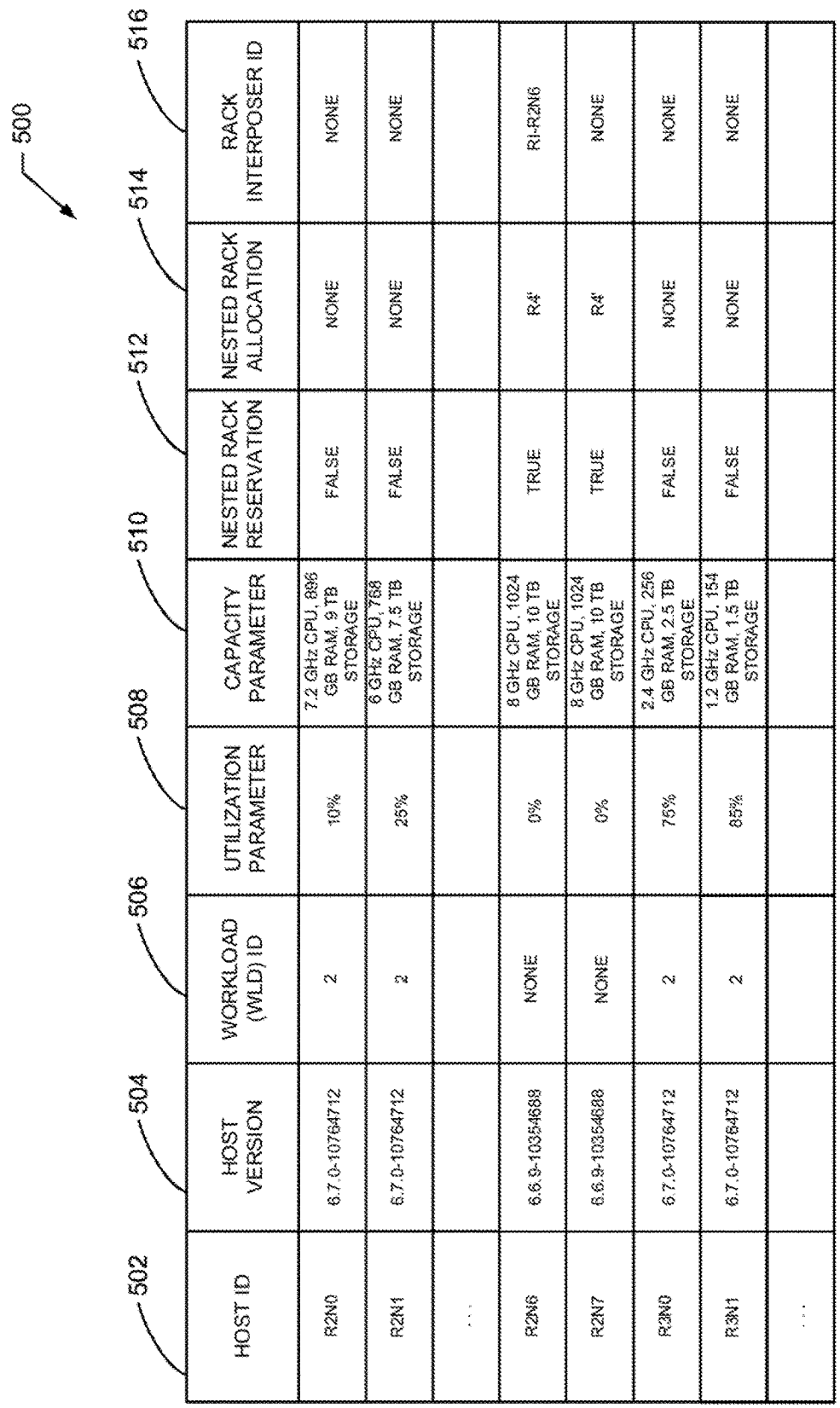
FIG. 5 depicts an example nested rack resource pool table based on example resources included in the example nested rack of FIGS. 1 and 3.

The NRM 158 of the illustrated example of FIG. 4 includes the resource data aggregator 430 to obtain and/or determine resource data associated with hosts of the physical racks 102, 104, 106. In some examples, resource data corresponds to information included in an example nested rack resource pool table 500 as depicted in FIG. 5. Turning to FIG. 5, the resource data may include an example host identifier (ID) 502, an example host version 504, an example workload domain (WLD) identifier (ID) 506, an example utilization parameter 508, and/or an example capacity parameter 510.

In the illustrated example of FIG. 5, the host identifier 502 can correspond to a designator or identifier of one of the server host nodes 116, 126, 136. For example, the host ID of R2N0 may correspond to the second server host node(0) 126 of R2 (i.e., the second physical rack 104). In FIG. 5, the host version 504 corresponds to a hypervisor software version associated with the host identifier 502. For example, a host version of 6.7.0-10764712 may correspond to a software version of 6.7.0-10764712 for a hypervisor on R2N0. In the illustrated example of FIG. 5, the WLD ID 506 can correspond to a designator or identifier of a workload domain that the host identifier 502 is allocated to and/or is otherwise associated with. For example, a WLD ID of 2 may correspond to the second workload domain 156. In other examples, a WLD ID of NONE can indicate that the corresponding host is not allocated to a workload domain. For example, a host having a WLD ID of NONE is an unmanaged host as the host is not managed by the SDDC manager 148 and is available as a free or spare resource that the SDDC manager 148 can reimage with a hypervisor and use the reimaged host to expand or create a workload domain.

In the illustrated example of FIG. 5, the utilization parameter 508 can correspond to a quantity of resources utilized by the host (e.g., associated with the host identifier 502. In some examples, the utilization parameter 508 corresponds to a utilization of resources averaged over a threshold time period (e.g., an hour, a day, a week, etc.). For example, a utilization parameter of 10% may correspond to 10% of the physical hardware resources of R2N0 are utilized over a threshold time period of one week. In other examples, a utilization parameter of 0% may correspond to the physical hardware resources of R2N6 not being utilized.

In the illustrated example of FIG. 5, the capacity parameter 510 can correspond to a quantity (e.g., a maximum quantity) of resources (e.g., CPU, memory, storage, etc.) associated with the host identifier 502 that are available (e.g., unutilized, unallocated, etc.). For example, a capacity parameter associated with R2N0 includes information corresponding to a CPU capacity of 7.2 GHz, a memory capacity of 896 GB RAM, and a storage capacity (e.g., a hybrid storage capacity) of 9 TB. In such examples, the 7.2 GHz of CPU capacity is a CPU capacity parameter value, the 896 GB RAM of storage capacity is a storage capacity parameter value, and the 9 TB of storage capacity is a storage capacity parameter value. In the illustrated example of FIG. 5, the capacity parameter associated with R2N6 includes a CPU capacity parameter value of 8 GHz, a memory capacity parameter value of 1024 GB RAM, and a storage capacity parameter value of 10 TB. In such examples, the NRM 158 can determine that R2N0 and R2N6 are candidates for nested rack generation based on at least one of the utilization parameter or the capacity parameter (e.g., one or more capacity parameter values included in the capacity parameter). In some examples, the resource data aggregator 430 obtains or determines nested rack resource data associated with the nested rack 160. For example, the nested rack resource data may correspond to information included in the nested rack resource pool table 500 of FIG. 5. The nested rack resource data may include an example nested rack reservation parameter 512, an example nested rack allocation parameter 514, and an example rack interposer identifier (ID) 516.

In the illustrated example of FIG. 5, the nested rack reservation parameter 512 can correspond to a designator or indicator that the server host node associated with the host identifier 502 has been reserved for nested rack generation.

For example, the nested rack reservation parameter 512 may have a value of TRUE or FALSE that is indicative of whether the server host node has been reserved. For example, a value of TRUE may correspond to the host ID R2N6 being allocated or, in some examples, being reserved for nested rack generation. In the illustrated example of FIG. 5, the nested rack allocation parameter 514 can correspond to a designator or indicator of the nested rack to which the server host node has been allocated. For example, a value of R4' for the nested rack reservation parameter 512 may correspond to the second server host node(6) 126 being allocated to the nested rack 160. In other examples, the nested rack reservation parameter 512 may have a null value (e.g., NONE) when the second server host node(6) 126 is not allocated to a nested rack.

In the illustrated example of FIG. 5, the rack interposer identifier 516 can correspond to a designator or indicator of a rack interposer (e.g., a rack interposer appliance) if deployed to a nested rack. For example, a value of RI-R2N6 for the rack interposer identifier 516 may indicate that a rack interposer (RI) has been deployed to the hypervisor 210 of the second server host node(6) 126 as designated by R2N6. In such examples, the rack interposer identifier 516 can indicate that the rack interposer appliance 316 of FIG. 3 intercepts calls by one of the third VMs 312 of FIG. 3 to the second server host node(6) 126.

Turning back to the illustrated example of FIG. 4, in some examples, the resource data aggregator 430 determines non-utilized resources associated with the virtual server rack 108. For example, the resource data aggregator 430 may determine a utilization parameter for respective ones of the physical hardware resources 140, 142, 144. In such examples, the resource data aggregator 430 can determine that ones of the physical hardware resources 140, 142, 144 are not utilized when respective ones of the utilization parameters have values of 0%. In other examples, the resource data aggregator 430 can determine that ones of the physical hardware resources 140, 142, 144 are underutilized when respective ones of the utilization parameters have values less than a utilization threshold.

In some examples, the resource data aggregator 430 determines capacity parameters for respective ones of the server host nodes 116, 126, 136 and/or the physical racks 102, 104, 106. In some examples, the second workload domain 156 requires additional hosts for expansion to fulfill a shortage of 256 GB of memory and 0.25 TB of storage, and the second server host node(7) 126 has a maximum capacity of 1 TB of memory and 5 TB of hybrid storage while having an average utilization of 0%. In such examples, the nested rack manager 158 can determine that the second server host node(7) 126 is a candidate for expanding the nested rack 160.

In some examples, the resource data aggregator 430 identifies one of the server host nodes 116, 126, 136 and/or one of the physical racks 102, 104, 106 as having the highest value for the capacity parameter For example, the resource data aggregator 430 may identify R2N6 and R2N7 of the nested rack resource pool table 500 as having the highest value for the capacity parameter based on having the highest quantities of CPU capacity, memory capacity and/or storage capacity. In other examples, the resource data aggregator 430 may identify the second physical rack 104 as having the highest capacity parameter based on having the highest quantities of CPU capacity, memory capacity, and/or storage capacity out of the physical racks 102, 104, 106.

In some examples, the resource data aggregator 430 implements means for determining utilization parameters, capacity parameters, etc., for respective ones of the server host nodes 116, 126, 136, the physical racks 102, 104, 106, and/or, more generally the virtual server rack 108. In some examples, the determining means obtains resource data associated with hosts of the physical racks 102, 104, 106. The determining means may determine non-utilized or unallocated ones of the server host nodes 116, 126, 136. The determining means may determine capacity parameters based on the non-utilized or unallocated ones of the server host nodes 116, 126, 136. The determining means may identify one or more of the server host nodes 116, 126, 136 and/or one or more of the physical racks 102, 104, 106 as having the highest capacity parameter value.

In some examples, the determining means is implemented by executable instructions such as that implemented by at least block 604 of FIG. 6, blocks 804, 806, 808, and 812 of FIG. 8, and blocks 906, 908, and 910 of FIG. 9, which may be executed on at least one processor such as the example processor 1012 shown in the example of FIG. 10. In other examples, the determining means is implemented by hardware logic, hardware implemented state machines, logic circuitry, and/or any other combination of hardware, software, and/or firmware.

The NRM 158 of the illustrated example of FIG. 4 includes the nested rack controller 440 to generate, manage, and decommission the nested rack 160. In some examples, the nested rack controller 440 generates the nested rack 160 using ones of the identified candidate resources. The nested rack controller 440 may determine whether there are enough ones of the identified candidate resources to build the nested rack 160. If the nested rack controller 440 determines that there are not enough resources, the nested rack controller 440 generates an alert indicative of insufficient resources to build the nested rack 160. For example, the alert may be transmitted to the user of the virtual server rack 160, an external computing system via the network 308 of FIG. 3, etc. If the nested rack controller 440 determines that there are enough resources, the nested rack controller 440 instructs the resource allocator 460 to allocate resources from ones of the identified candidate resources to build the nested rack 160. After building the nested rack 160, the nested rack controller 440 may configure the nested rack 160, migrate hosts from one of the physical racks 102, 104, 106 to the nested rack 160, and direct the migrated hosts to execute tasks associated with an application. In some examples, the nested rack controller 440 determines whether to decommission the nested rack 160. For example, the nested rack 160 may complete an assigned workload or a pre-determined quantity of computing tasks. If the nested rack controller 440 determines to decommission the nested rack 160, the nested rack controller 440 may invoke the resource deallocator 470 to deallocate resources from the nested rack 160.

In some examples, the nested rack controller 440 determines whether one or more of the resources allocated to the nested rack 160 are supported by the nested rack. If the resources allocated to the nested rack 160 are supported by the nested rack, the nested rack controller 440 may proceed to configure the nested rack 160. If one of the resources allocated to the nested rack 160 are not supported by the nested rack, the nested rack controller 440 may deploy a rack interposer appliance. For example, one of the resources to be allocated to the nested rack 160 may be the non-nesting device 318 of FIG. 3. In such examples, the nested rack controller 440 may determine that the non-nesting device 318 does not support hypervisor nesting. Accordingly, the nested rack controller 440 may direct the rack interposer deployer 450 to deploy the rack interposer appliance 316 of FIG. 3 to facilitate operation of the non-nesting device 318 with the nested hypervisor 162 of FIGS. 1-3.

In some examples, the nested rack controller 440 determines whether a capacity parameter satisfies one or more nested capacity thresholds (e.g., a nested CPU capacity threshold, a nested memory capacity threshold, a nested storage capacity threshold, etc.). For example, the resource data aggregator 430 may determine a capacity parameter indicative of 8 GHz CPU capacity, 1024 GB RAM memory capacity, and 10 TB storage capacity of the second server host node(6) 126. The nested rack controller 440 may determine that the CPU capacity parameter value of 8 GHz CPU capacity satisfies a nested CPU capacity threshold of 4.5 GHz CPU because the CPU capacity parameter value included in the capacity parameter is greater than the nested CPU capacity threshold. The nested rack controller 440 may determine that the memory capacity parameter value of 1024 GB RAM capacity satisfies the nested memory capacity threshold of 800 GB RAM because the memory capacity parameter value included in the capacity parameter is greater than the nested memory capacity threshold. The nested rack controller 440 may determine that the storage capacity parameter value of 10 TB capacity satisfies the nested storage capacity threshold of 3 TB because the storage capacity parameter value included in the capacity parameter is greater than the nested storage capacity threshold.

When the capacity parameter (e.g., the one or more capacity parameter values included in the capacity parameter) satisfies one or more of the nested capacity thresholds, the nested rack controller 440 may identify the second server host node(6) 126 as a candidate resource and/or, in some examples, allocate the second server host node(6) 126 to a candidate resource pool. The candidate resource pool may correspond to an aggregation of ones of the physical hardware resources 140, 142, 144, the server host nodes 116, 126, 136, the physical racks 102, 104, 106, etc., and/or a combination thereof that correspond to candidate resources that can be used for nested rack generation. In such examples, the nested rack controller 440 can generate the nested rack 160 from resources included in the candidate resource pool. Alternatively, the nested rack controller 440 may generate an alert when the capacity parameter (e.g., information included in and/or otherwise indicated by the capacity parameter) does not satisfy one or more nested capacity thresholds.

In some examples, the nested rack controller 440 implements means for generating the nested rack 160 using candidate resources. In some examples, the generating means generate the nested rack 160 after determining that there is a sufficient quantity of candidate resources to generate the nested rack 160. The generating means may deploy the nested rack 160. After deployment, the generating means may configure the nested rack 160 and cause the nested rack 160 to execute tasks associated with an application. In some examples, the generating means invokes a deployment of a rack interposer, such as the rack interposer appliance 316, to facilitate operation of the non-nesting device 318 with a corresponding one of the nested hypervisors 162.

In some examples, the generating means is implemented by executable instructions such as that implemented by at least blocks 610, 612, 616, 620, 622, 624, and 626 of FIG. 6, blocks 814 and 816 of FIG. 8, and block 920 of FIG. 9, which may be executed on at least one processor such as the example processor 1012 shown in the example of FIG. 10. In other examples, the generating means is implemented by hardware logic, hardware implemented state machines, logic circuitry, and/or any other combination of hardware, software, and/or firmware.

The NRM 158 of the illustrated example of FIG. 4 includes the rack interposer deployer 450 to deploy a rack interposer, such as the rack interposer appliance 316 of FIG. 3, to the nested rack 160. In some examples, the rack interposer deployer 450 installs and/or otherwise deploys one or more function call intercepting libraries on one of the nested hypervisor 162 to be in communication with the rack interposer appliance 316. In some examples, the rack interposer deployer 450 configures the rack interposer appliance 316 using information associated with the non-nesting device 318. For example, the rack interposer deployer 450 may configure the rack interposer appliance 316 with a corresponding driver, library, and/or other machine-readable instructions that facilitate operation of the rack interposer appliance 316 in connection with the non-nesting device 318.

In some examples, the rack interposer deployer 450 implements means for deploying the rack interposer appliance 316. In some examples, the deploying means deploy the rack interposer appliance 316 to the hypervisor 210 of the second server host node(6) 126 as depicted in FIG. 3 to intercept calls from one of the third VMs 312 to the non-nesting device 318 in communication with the second server host node(6) 126. In some examples, the deploying means configures the non-nesting device 318 using one or more function call intercepting libraries.

In some examples, the deploying means is implemented by executable instructions such as that implemented by at least block 618 of FIG. 6, which may be executed on at least one processor such as the example processor 1012 shown in the example of FIG. 10. In other examples, the deploying means is implemented by hardware logic, hardware implemented state machines, logic circuitry, and/or any other combination of hardware, software, and/or firmware.

The NRM 158 of the illustrated example of FIG. 4 includes the resource allocator 460 to allocate a physical hardware resource. In some examples, the resource allocator 460 allocates a host to a candidate resource pool when a corresponding capacity parameter satisfies a nested capacity threshold. In some examples, the resource allocator 460 allocates resources from the candidate resource pool (e.g., from one or more of the physical racks 102, 104, 106) to the nested rack 160 to build and/or otherwise assemble the nested rack 160.

In some examples, the resource allocator 460 implements allocating means for allocating a resource to generate the nested rack 160. In some examples, the allocating means is implemented by executable instructions such as that implemented by at least block 614 of FIG. 6 and block 914 of FIG. 9, which may be executed on at least one processor such as the example processor 1012 shown in the example of FIG. 10. In other examples, the allocating means is implemented by hardware logic, hardware implemented state machines, logic circuitry, and/or any other combination of hardware, software, and/or firmware.

The NRM 158 of the illustrated example of FIG. 4 includes the resource deallocator 470 to deallocate a physical hardware resource. In some examples, the resource deallocator 470 deallocates a host from the nested rack 160 to decommission and/or otherwise dissolve the nested rack 160. For example, the resource deallocator 470 may return a deallocated resource to a pool of available resources that can be re-allocated to a workload domain.

In some examples, the resource deallocator 470 implements deallocating means for deallocating a resource from the nested rack 160 to decommission the nested rack 160. In some examples, the deallocating means is implemented by executable instructions such as that implemented by at least block 628 of FIG. 6, which may be executed on at least one processor such as the example processor 1012 shown in the example of FIG. 10. In other examples, the deallocating means is implemented by hardware logic, hardware implemented state machines, logic circuitry, and/or any other combination of hardware, software, and/or firmware.

The NRM 158 of the illustrated example of FIG. 4 includes the database 480 to record and/or otherwise store data. For example, the database 480 may store a nested resource policy, resource data, nested rack resource data, one or more nested rack resource pool tables 500, etc. The database 480 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The database 480 can additionally or alternatively be implemented by one or more double data rate (DDR) memories, such as DDR, DDR2, DDR3, mobile DDR (mDDR), etc. The database 480 can additionally or alternatively be implemented by one or more mass storage devices such as hard disk drive(s), compact disk drive(s) digital versatile disk drive(s), etc. While in the illustrated example of FIG. 4 the database 480 is illustrated as a single database, the database 480 can be implemented by any number and/or type(s) of databases. Furthermore, the data stored in the database 480 can be in any data format such as, for example, binary data, comma delimited data, tab delimited data, structured query language (SQL) structures, etc.

While an example manner of implementing the NRM 158 of FIGS. 1-3 is illustrated in FIG. 4, one or more of the elements, processes, and/or devices illustrated in FIG. 4 may be combined, divided, re-arranged, omitted, eliminated, and/or implemented in any other way. Further, the example resource policy controller 410, the example resource discoverer 420, the example resource data aggregator 430, the example nested rack controller 440, the example rack interposer deployer 450, the example resource allocator 460, the example resource deallocator 470, the example database 480, and/or, more generally, the example NRM 158 of FIGS. 1-3 may be implemented by hardware, software, firmware, and/or any combination of hardware, software, and/or firmware. Thus, for example, any of the example resource policy controller 410, the example resource discoverer 420, the example resource data aggregator 430, the example nested rack controller 440, the example rack interposer deployer 450, the example resource allocator 460, the example resource deallocator 470, the example database 480, and/or, more generally, the example NRM 158 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example resource policy controller 410, the example resource discoverer 420, the example resource data aggregator 430, the example nested rack controller 440, the example rack interposer deployer 450, the example resource allocator 460, the example resource deallocator 470, and/or the example database 480 is/are hereby expressly defined to include a non-transitory computer readable storage device or storage disk such as a memory, a digital versatile disk (DVD), a compact disk (CD), a Blu-ray disk, etc., including the software and/or firmware. Further still, the example NRM 158 of FIGS. 1-3 may include one or more elements, processes, and/or devices in addition to, or instead of, those illustrated in FIG. 4, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the NRM 158 of FIGS. 1-4 are shown in FIGS. 6-9. The machine readable instructions may be one or more executable program(s) or portions of one or more executable program(s) for execution by a computer processor such as the processor 1012 shown in the example processor platform 1000 discussed below in connection with FIG. 10. The program(s) may be embodied in software stored on a non-transitory computer readable storage medium such as a CD-ROM, a floppy disk, a hard drive, a DVD, a Blu-ray disk, or a memory associated with the processor 1012, but the entire program(s) and/or parts thereof could alternatively be executed by a device other than the processor 1012 and/or embodied in firmware or dedicated hardware. Further, although the example program(s) is/are described with reference to the flowcharts illustrated in FIGS. 6-9, many other methods of implementing the example NRM 158 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 6-9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 6 is a flowchart representative of example machine readable instructions 600 which may be executed to implement the NRM 158 of FIGS. 1-4 to deploy the nested rack 160 of FIGS. 1-3. The machine readable instructions 600 of FIG. 6 begin at block 602, at which the NRM 158 identifies host(s) of physical rack(s) to be processed. For example, the resource discoverer 420 (FIG. 4) may identify the third physical rack 106 to be upgraded from a first firmware version to a second firmware version. In such examples, the resource discoverer 420 can identify the third server host nodes(0-1) 136 as allocated to the second workload domain 156. The resource discoverer 420 may identify the third server host nodes(0-1) 136 to process by triggering a generation of the nested rack 160 to migrate the third server host nodes(0-1) 136 to other server host nodes to perform the upgrade with reduced downtime compared to previous implementations.

At block 604, the NRM 158 obtains resource data associated with the host(s) of the physical rack(s). For example, the resource data aggregator 430 (FIG. 4) may obtain resource data, nested rack resource data, etc., associated with the second physical hardware resources 142 of the second server host nodes 126. At block 606, the NRM 158 obtains a nested resource policy. For example, the resource policy controller 410 (FIG. 4) may obtain the nested resource policy from the database 480 (FIG. 4).

At block 608, the NRM 158 determines candidate resources for nested rack allocation based on the nested resource policy. For example, the resource policy controller 410 may identify the second physical hardware resources 142 of the second server host nodes(5-7) 126 as reserved resources for nested rack generation based on the nested resource policy. In other examples, the resource policy controller 410 can identify the first physical hardware resources 140 of the first server host node(4) 116, the second physical hardware resources 142 of the second server host node(7) 126, etc., as candidate resources for nested rack generation. An example process that may be used to implement block 608 is described below in connection with FIG. 7.

At block 610, the NRM 158 determines whether there are enough resources to build a nested rack. For example, the nested rack controller 440 (FIG. 4) may determine that a first quantity of resources as specified by and/or otherwise based on the nested resource policy can be satisfied by ones of the candidate resources. In other examples, the nested rack controller 440 can determine that the ones of the candidate resources are a second quantity less than the first quantity and, thus, cannot generate the nested rack 160 due to insufficient ones of the candidate resources.

If, at block 610, the NRM 158 determines that there are not enough resources to build a nested rack, then, at block 612, the NRM 158 generates an alert. For example, the nested rack controller 440 may generate an alert to a user, a computing device, etc., indicative of insufficient resources to generate the nested rack 160. In such examples, a user can modify the nested rack policy to broaden or loosen requirements to (potentially) obtain additional candidate resources responsive to the alert. In response to generating the alert at block 612, the machine readable instructions 600 of FIG. 6 conclude.

If, at block 610, the NRM 158 determines that there are enough resources to build the nested rack, control proceeds to block 614 to allocate resource(s) from the physical rack(s) to build the nested rack. For example, the resource allocator 460 may allocate one or more of the candidate resources to build the nested rack 160. In such examples, the one or more candidate resources can be included in the same server host node, physical rack, or virtual server rack. Alternatively, the one or more candidate resources may be in different server host nodes, physical racks, or virtual server racks.

At block 616, the NRM 158 determines whether the allocated resource(s) are supported by the nested rack. For example, the nested rack controller 440 may determine that one of the candidate resources allocated to the nested rack 160 is the non-nesting device 318. In such examples, the nested rack controller 440 can determine that the non-nesting device 318 cannot support hypervisor nesting (e.g., cannot support the nested hypervisor 162).

If, at block 616, the NRM 158 determines that the allocated resource(s) are supported by the nested rack, control proceeds to block 620 to generate the nested rack. If, at block 616, the NRM 158 determines that one or more of the allocated resource(s) are not supported by the nested rack, then, at block 618, the NRM 158 deploys one or more rack interposers to the nested rack. For example, the rack interposer deployer 450 (FIG. 4) may deploy the rack interposer appliance 316 to the hypervisor 210 of the second server host node(6) 126 to facilitate operation of the non-nesting device 318 with the first one of the nested hypervisors 162.

At block 620, the NRM 158 generates the nested rack. For example, the nested rack controller 440 may configure the nested rack 160 using the configurations, applications, software versions, etc., associated with the third server host nodes(0-1) 136 to be migrated. In such examples, the nested rack controller 440 can generate the nested rack 160 by deploying the nested hypervisor 162 on the hypervisor 210 of the second server host node(6) 126 to facilitate communication between the third VMs 312 on the nested hypervisor 162 and one or more of the second physical hardware resources 142.

At block 622, the NRM 158 migrates the identified host(s) to the nested rack. For example, the nested rack controller 440 may migrate the third server host nodes(0-1) 136 to the nested rack 160. At block 624, the NRM 158 executes tasks on the identified host(s). For example, the NRM 158 may instruct and/or otherwise cause the third server host nodes 136 to be upgraded. In such examples, the NRM 158 can cause the third server host nodes 136 to be upgraded from the first firmware version to the second firmware version.

At block 626, the NRM 158 determines whether to decommission the nested rack. For example, the nested rack controller 440 may determine that the firmware upgrade of the third server host nodes 136 are complete. In such examples, the nested rack controller 440 can invoke the resource deallocator 470 (FIG. 4) to deallocate resources of the nested rack 160 when the nested rack 160 is no longer needed.

If, at block 626, the NRM 158 determines not to decommission the nested rack, the machine readable instructions 600 of FIG. 6 conclude. If, at block 626, the NRM 158 determines to decommission the nested rack, then, at block 628, the NRM 158 decommissions the nested rack by deallocating resources. For example, the resource deallocator 470 may deallocate the second physical hardware resources 142 assigned to the nested rack 160 to dissolve the nested rack 160. In response to decommissioning the nested rack by deallocating resources at block 628, the machine readable instructions 600 of FIG. 6 conclude.

FIG. 7 is a flowchart representative of the machine readable instructions 608 of FIG. 6 which may be executed to implement the example NRM 158 of FIGS. 1-4 to determine candidate resources for nested rack allocation based on a nested resource policy. The process of FIG. 7 may be used to implement block 608 of FIG. 6. The machine readable instructions 608 of FIG. 7 begin at block 702, at which the NRM 158 determines whether the nested resource policy indicates resources of free host(s) are reserved. For example, the resource policy controller 410 (FIG. 4) may determine that the nested resource policy indicates that candidate resources are to be obtained from resources reserved for nested rack generation. In such examples, the resource policy controller 410 can determine that the second server host nodes(5-7) 126 are reserved for generation of a nested rack based on the nested resource policy.

If, at block 702, the NRM 158 determines that the nested resource policy does not indicate resources of free host(s) are reserved, control proceeds to block 706 to determine whether the nested resource policy indicates identifying candidate resources at a physical rack level. If, at block 702, the NRM 158 determines that the nested resource policy indicates resources of free host(s) are reserved, then, at block 704, the NRM 158 identifies the reserved resources as candidate resources. For example, the resource policy controller 410 may identify the second server host nodes(5-7) 126 as candidate resources. In such examples, the nested rack controller 440 (FIG. 4) can generate the nested rack 160 using ones of the second physical hardware resources 142 of the second server host nodes(5-7) 126.

At block 706, the NRM 158 determines whether the nested resource policy indicates identifying candidate resources at a physical rack level. For example, the resource policy controller 410 may determine that the nested resource policy indicates that candidate resources are to be obtained from resources included in one of the physical racks 102, 104, 106. In other examples, the resource policy controller 410 can determine that the nested resource policy does not indicate that candidate resources are to be obtained from a single one of the physical racks 102, 104, 106.

If, at block 706, the NRM 158 determines that the nested resource policy indicates identifying candidate resources at the physical rack level, then, at block 708, the NRM 158 identifies resources from a physical rack as candidate resources. For example, the resource discoverer 420 (FIG. 4) may process (e.g., iteratively process) the first server host nodes 116, the second server host nodes 126, etc., to identify resources from one of the first or second physical racks 102, 104 for nested rack generation. An example process that may be used to implement block 708 is described below in connection with FIG. 8.

If, at block 706, the NRM 158 does not determine that the nested resource policy indicates identifying candidate resources at the physical rack level, control proceeds to block 710 to determine whether the nested resource policy indicates identifying candidate resources at the virtual environment level. For example, the resource policy controller 410 may determine that the nested resource policy indicates that candidate resources may be selected from more than one of the physical racks 102, 104, 106 of the virtual server rack 108. In such examples, the candidate resources can be obtained from one or more of the physical racks 102, 104, 106.

If, at block 710, the NRM 158 determines that the nested resource policy does not indicate identifying candidate resources at the virtual environment level, the machine readable instructions 608 of FIG. 7 return to block 610 of FIG. 6 to determine whether there are enough resources to build a nested rack. If, at block 710, the NRM 158 determines that the nested resource policy indicates identifying candidate resources at the virtual environment level, then, at block 712, the NRM 158 identifies resources across physical racks as candidate resources. For example, the resource discoverer 420 may identify one or more of the first physical hardware resources 140 and one or more of the second physical hardware resources 142 as candidate resources for nested rack generation. An example process to implement block 712 is described below in connection with FIG. 9. In response to identifying the resources across physical racks as candidate resources at block 712, the machine readable instructions 608 of FIG. 7 return to block 610 of FIG. 6 to determine whether there are enough resources to build a nested rack.

FIG. 8 is a flowchart representative of the machine readable instructions 708 of FIG. 7 which may be executed to implement the NRM 158 of FIGS. 1-4 to identify resources from a physical rack as candidate resources. The process of FIG. 8 may be used to implement block 708 of FIG. 7. The machine readable instructions 708 of FIG. 8 begin at block 802, at which the NRM 158 selects a physical rack of interest to process. For example, the resource discoverer 420 (FIG. 4) may select the second physical rack 104 of FIG. 1 to process.

At block 804, the NRM 158 obtains resource data associated with host(s) of the selected physical rack. For example, the resource data aggregator 430 (FIG. 4) may obtain the host identifier 502, the host version 504, the workload domain identifier 506, etc., of FIG. 5 associated with one or more of the second server host nodes 126.

At block 806, the NRM 158 determines non-utilized resources associated with the host(s). For example, the resource data aggregator 430 may determine that compute resources, storage resources, etc., of the second server host node(6) 126 are not utilized based on a respective utilization parameter. In such examples, the resource data aggregator 430 can determine that the compute resources of the second server host node(6) 126 have a utilization parameter value of 0% indicating they are not being utilized.

At block 808, the NRM 158 determines a capacity parameter based on the non-utilized resources. For example, the resource data aggregator 430 may determine a capacity parameter of the second server host node(6) 126 based on a quantity of non-utilized resources, the utilization parameter, etc., and/or a combination thereof. For example, the resource data aggregator 430 may determine a capacity parameter including information corresponding to 8 GHZ of CPU capacity, 1024 GB RAM of memory capacity, and 10 TB of storage capacity.

At block 810, the NRM 158 determines whether to select another physical rack of interest to process. For example, the resource discoverer 420 may determine to select the first physical rack 102 to process. If, at block 810, the NRM 158 determines to select another physical rack of interest to process, control returns to block 802 to select another physical rack of interest to process. If, at block 810, the NRM 158 determines not to select another physical rack of interest to process, then, at block 812, the NRM 158 identifies the physical rack with the highest value for the capacity parameter. For example, the resource data aggregator 430 may determine that the first physical rack 102 has a first capacity parameter indicative of 30 GHz of CPU capacity and that the second physical rack 104 has a second capacity parameter indicative of 60 GHz of CPU capacity. In such examples, the resource data aggregator 430 can identify the second physical rack 104 as having the highest value for the capacity parameter. Additionally or alternatively, the resource data aggregator 430 can identify the second physical rack 104 as having the highest value for the capacity parameter based on the second physical rack 104 having the highest values of CPU capacity, memory capacity, and/or storage capacity.

At block 814, the NRM 158 determines whether the capacity parameter satisfies a nested capacity threshold. For example, the nested rack controller 440 (FIG. 4) may determine that the second capacity parameter of 60 GHz of CPU capacity is greater than a nested CPU capacity threshold of 35 GHz of CPU capacity and, thus, satisfies the nested CPU capacity threshold. In other examples, the nested rack controller 440 may determine that the second capacity parameter of 40 TB of storage capacity is greater than a nested storage capacity threshold of 25 TB of storage capacity and, thus, satisfies the nested storage capacity threshold.

If, at block 814, the NRM 158 determines that the capacity parameter does not satisfy the nested capacity threshold, then, at block 816, the NRM 158 generates an alert. For example, the nested rack controller 440 may generate an alert to a user, a computing device, etc., that the second physical rack 104 does not have enough resources to generate the nested rack 160 as specified by the nested resource policy. In response to generating the alert at block 816, the machine readable instructions 708 of FIG. 8 return to block 710 of FIG. 7 to determine whether the nested resource policy indicates identifying candidate resources at the virtual environment level.

If, at block 814, the NRM 158 determines that the capacity parameter satisfies the nested capacity threshold, then, at block 818, the NRM 158 identifies the physical rack as the candidate physical rack. For example, the resource discoverer 420 may identify the second physical rack 104 as the candidate physical rack from which resources may be used to generate the nested rack 160. In response to identifying the physical rack as the candidate physical rack at block 818, the NRM 158 identifies resources from the candidate physical rack as candidate resources at block 820. For example, the resource discoverer 420 may identify the second physical hardware resources 142 as candidate resources to be used for generating the nested rack 160. In response to identifying the resources from the candidate physical rack as candidate resources at block 820, the machine readable instructions 708 of FIG. 8 return to block 710 of FIG. 7 to determine whether the nested resource policy indicates identifying candidate resources at the virtual environment level.

FIG. 9 is a flowchart representative of the machine readable instructions 712 of FIG. 7 which may be executed to implement the NRM 158 of FIGS. 1-4 to identify resources across physical racks as candidate resources. The process of FIG. 9 may be used to implement block 712 of FIG. 7. The machine readable instructions 712 of FIG. 8 begin at block 902, at which the NRM 158 selects a physical rack of interest to process. For example, the resource discoverer 420 (FIG. 4) may select the second physical rack 104 of FIG. 1 to process. At block 904, the NRM 158 selects a host of interest to process. For example, the resource discoverer 420 may select the second server host node(7) 126 of FIG. 1 to process.

At block 906, the NRM 158 obtains resource data associated with the selected host. For example, the resource data aggregator 430 (FIG. 4) may obtain one or more items of information of the nested rack resource pool table 500 (described above in connection with FIG. 5).

At block 908, the NRM 158 determines non-utilized resources associated with the selected host. For example, the resource data aggregator 430 may determine that compute resources, storage resources, etc., of the second server host node(7) 126 are not utilized based on a respective utilization parameter. In such examples, the resource data aggregator 430 can determine that the compute resources of the second server host node(7) 126 have a utilization parameter value of 0% indicating they are not being utilized.

At block 910, the NRM 158 determines a capacity parameter based on the non-utilized resources. For example, the resource data aggregator 430 may determine a capacity parameter of the second server host node(7) 126 based on a quantity of non-utilized resources, the utilization parameter, etc., and/or a combination thereof. For example, the resource data aggregator 430 may determine a capacity parameter including information corresponding to 8 GHZ of CPU capacity, 1024 GB RAM of memory capacity, and 10 TB of storage capacity.

At block 912, the NRM 158 determines whether the capacity parameter satisfies a nested capacity threshold. For example, the nested rack controller 440 (FIG. 4) may determine that the second capacity parameter of 60 GHz of CPU capacity is greater than a nested CPU capacity threshold of 35 GHz of CPU capacity and, thus, satisfies the nested CPU capacity threshold. In other examples, the nested rack controller 440 may determine that the second capacity parameter of 40 TB of storage capacity is greater than a nested storage capacity threshold of 25 TB of storage capacity and, thus, satisfies the nested storage capacity threshold.

If, at block 912, the NRM 158 determines that the capacity parameter does not satisfy the nested capacity threshold, then, at block 916, the NRM 158 determines whether to select another host of interest to process. If, at block 912, the NRM 158 determines that the capacity parameter satisfies the nested capacity threshold, then, at block 914, the NRM 158 allocates the host to a candidate resource pool. For example, the resource allocator 460 (FIG. 4) may allocate the second server host node(5) 126 to a candidate resource pool when the capacity parameter satisfies the nested capacity threshold. In such examples, the nested rack 160 can be generated from one or more of the resources assigned to the candidate resource pool.

In response to allocating the host to the candidate resource pool at block 914, the NRM 158 determines whether to select another host of interest to process at block 916. For example, the resource discoverer 420 may select the second server host node(6) 126 to process. If, at block 916, the NRM 158 determines to select another host of interest to process, control returns to block 904 to select another host of interest to process. If, at block 916, the NRM 158 determines not to select another host of interest to process, then, at block 918, the NRM 158 determines whether to select another physical rack of interest to process. For example, the resource discoverer 420 may determine to select the first physical rack 102 to process.

If, at block 918, the NRM 158 determines to select another physical rack of interest to process, control returns to block 902 to select another physical rack of interest to process. If, at block 918, the NRM 158 determines not to select another physical rack of interest to process, then, at block 920, the NRM 158 identifies resources associated with hosts in the candidate resource pool as candidate resources. For example, the resource discoverer 420 may identify compute resources, storage resources, etc., of the second server host node(5) 126 as candidate resources from which the nested rack 160 may be generated. In response to identifying the resources associated with the hosts in the candidate resource pool as candidate resources at block 920, the machine readable instructions 712 of FIG. 9 return to block 610 of FIG. 6 to determine whether there are enough resources to build the nested rack.

FIG. 10 is a block diagram of an example processor platform 1000 structured to execute the instructions of FIGS. 6-9 to implement the NRM 158 of FIGS. 1-4. The processor platform 1000 can be, for example, a server, a personal computer, a workstation, a self-learning machine (e.g., a neural network), or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1012 implements the example resource policy controller 410, the example resource discoverer 420, the example resource data aggregator 430, the example nested rack controller 440, the example rack interposer deployer 450, the example resource allocator 460, and the example resource deallocator 470 of FIG. 4.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) 1022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 1020 of the illustrated example, thus, typically includes a graphics driver card, a graphics driver chip, and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives. In this example, the one or more mass storage devices 1028 implement the database 480 of FIG. 4. In this example, the database 480 includes the example nested rack resource pool table 500 of FIG. 5.

The machine executable instructions 1032 of FIGS. 6-9 may be stored in the mass storage device 1028, in the volatile memory 1014, in the non-volatile memory 1016, and/or on a removable non-transitory computer readable storage medium such as a CD or DVD.

From the foregoing, it will be appreciated that example methods, apparatus, and articles of manufacture have been disclosed for rack nesting in virtualized server systems. The disclosed methods, apparatus, and articles of manufacture reduce the need to have spare physical racks, spare storage space, etc., when performing a maintenance task such as a hardware, firmware, and/or software upgrade by using existing ones of unutilized and/or underutilized physical hardware resources. The disclosed methods, apparatus, and articles of manufacture improve resource management of existing physical hardware resources by determining ones of the existing physical hardware resources that can be used to execute computing tasks instead of idling for tasks that may not be obtained for processing. The disclosed methods, apparatus, and articles of manufacture improve the efficiency of using a computing device by allocating or, in some examples, re-allocating unutilized and/or underutilized resources to a virtual rack nested within one or more existing physical racks to execute increased computing workloads compared to prior implementations. By allocating or re-allocating unutilized and/or underutilized resources to consolidate existing workloads, other resources may be made available to process additional computing tasks. The disclosed methods, apparatus, and articles of manufacture are accordingly directed to one or more improvement(s) in the functioning of a computer.

The following pertain to further examples disclosed herein.

Example 1 includes an apparatus to generate a nested virtual server rack in a virtual server environment, the apparatus comprising a resource discoverer to identify physical hardware resources based on a nested resource policy indicative of one or more physical server racks from which to identify the physical hardware resources, and determine candidate physical hardware resources from the physical hardware resources based on a capacity parameter, the capacity parameter indicative of a quantity of the physical hardware resources available to be allocated to the nested virtual server rack, the candidate physical hardware resources to have first hypervisors, and a nested rack controller to generate the nested virtual server rack by deploying second hypervisors on the first hypervisors, the second hypervisors to facilitate communication between the candidate physical hardware resources and one or more virtual machines on the second hypervisors, the nested virtual server rack to execute one or more computing tasks based on the communication.

Example 2 includes the apparatus of example 1, wherein the quantity is a first quantity, and further including a resource data aggregator to determine a utilization parameter indicative of a second quantity of the physical hardware resources being utilized to execute a computing task, and determine the capacity parameter based on the utilization parameter.

Example 3 includes the apparatus of example 1, wherein a first one of the candidate physical hardware resources is in communication with a first one of the first hypervisors, the first one of the candidate physical hardware resources is not to support two or more hypervisors, and further including a rack interposer deployer to deploy a rack interposer appliance on the first one of the first hypervisors, the rack interposer appliance is to obtain a message from a first one of the one or more virtual machines on a first one of the second hypervisors directed to the first one of the second hypervisors, and transmit the message to the first one of the first hypervisors instead of the first one of the second hypervisors.

Example 4 includes the apparatus of example 3, wherein the first one of the candidate physical hardware resources is a graphic processing unit (GPU) or a universal serial bus (USB) device.

Example 5 includes the apparatus of example 1, wherein the physical hardware resources are first physical hardware resources, and further including the resource discoverer to identify the one or more virtual machines on second physical hardware resources to migrate to the candidate physical hardware resources, the nested rack controller to migrate the one or more virtual machines to the candidate physical hardware resources when the one or more virtual machines are deployed to the second hypervisors, upgrade the second physical hardware resources from a first version to a second version, and migrate the one or more virtual machines back to the second physical hardware resources when the second physical hardware resources are upgraded to the second version, and a resource deallocator to decommission the nested virtual server rack when the one or more virtual machines are migrated back to the second physical hardware resources.

Example 6 includes the apparatus of example 5, wherein the resource deallocator is to decommission the nested virtual server rack by deallocating the candidate physical hardware resources from the nested virtual server rack and returning the candidate physical hardware resources to a pool of available resources.

Example 7 includes the apparatus of example 1, wherein the nested virtual server rack is to execute the one or more computing tasks by instructing, with a first one of the second hypervisors, a first one of the first hypervisors to execute the one or more computing tasks, and instructing, with the first one of the first hypervisors, one or more of the candidate physical hardware resources to execute the one or more computing tasks.

Example 8 includes a non-transitory computer readable storage medium comprising instructions which, when executed, cause a machine to at least identify physical hardware resources based on a nested resource policy indicative of one or more physical server racks from which to identify the physical hardware resources, determine candidate physical hardware resources from the physical hardware resources based on a capacity parameter, the capacity parameter indicative of a quantity of the physical hardware resources available to be allocated to the nested virtual server rack, the candidate physical hardware resources to have first hypervisors, and generate the nested virtual server rack by deploying second hypervisors on the first hypervisors, the second hypervisors to facilitate communication between the candidate physical hardware resources and one or more virtual machines on the second hypervisors, the nested virtual server rack to execute one or more computing tasks based on the communication.

Example 9 includes the non-transitory computer readable storage medium of example 8, wherein the quantity is a first quantity, and the instructions, when executed, cause the machine to determine a utilization parameter indicative of a second quantity of the physical hardware resources being utilized to execute a computing task, and determine the capacity parameter based on the utilization parameter.

Example 10 includes the non-transitory computer readable storage medium of example 8, wherein a first one of the candidate physical hardware resources is in communication with a first one of the first hypervisors, the first one of the candidate physical hardware resources is not to support two or more hypervisors, and the instructions, when executed, cause the machine to deploy a rack interposer appliance on the first one of the first hypervisors, the rack interposer appliance is to obtain a message from a first one of the one or more virtual machines on a first one of the second hypervisors directed to the first one of the second hypervisors, and transmit the message to the first one of the first hypervisors instead of the first one of the second hypervisors.

Example 11 includes the non-transitory computer readable storage medium of example 10, wherein the first one of the candidate physical hardware resources is a graphic processing unit (GPU) or a universal serial bus (USB) device.

Example 12 includes the non-transitory computer readable storage medium of example 8, wherein the physical hardware resources are first physical hardware resources, and the instructions, when executed, cause the machine to identify the one or more virtual machines on second physical hardware resources to migrate to the candidate physical hardware resources, migrate the one or more virtual machines to the candidate physical hardware resources when the one or more virtual machines are deployed to the second hypervisors, upgrade the second physical hardware resources from a first version to a second version, migrate the one or more virtual machines back to the second physical hardware resources when the second physical hardware resources are upgraded to the second version, and decommission the nested virtual server rack when the one or more virtual machines are migrated back to the second physical hardware resources.

Example 13 includes the non-transitory computer readable storage medium of example 12, wherein the instructions, when executed, cause the machine to decommission the nested virtual server rack by deallocating the candidate physical hardware resources from the nested virtual server rack and returning the candidate physical hardware resources to a pool of available resources.

Example 14 includes the non-transitory computer readable storage medium of example 8, wherein the nested virtual server rack is to execute the one or more computing tasks by instructing, with a first one of the second hypervisors, a first one of the first hypervisors to execute the one or more computing tasks, and instructing, with the first one of the first hypervisors, one or more of the candidate physical hardware resources to execute the one or more computing tasks.

Example 15 includes a method to generate a nested virtual server rack in a virtual server environment, the method comprising identifying physical hardware resources based on a nested resource policy indicative of one or more physical server racks from which to identify the physical hardware resources, determining candidate physical hardware resources from the physical hardware resources based on a capacity parameter, the capacity parameter indicative of a quantity of the physical hardware resources available to be allocated to the nested virtual server rack, the candidate physical hardware resources to have first hypervisors, and generating the nested virtual server rack by deploying second hypervisors on the first hypervisors, the second hypervisors to facilitate communication between the candidate physical hardware resources and one or more virtual machines on the second hypervisors, the nested virtual server rack to execute one or more computing tasks based on the communication.

Example 16 includes the method of example 15, wherein the quantity is a first quantity, and further including determining a utilization parameter indicative of a second quantity of the physical hardware resources being utilized to execute a computing task, and determining the capacity parameter based on the utilization parameter.

Example 17 includes the method of example 15, wherein a first one of the candidate physical hardware resources is in communication with a first one of the first hypervisors, the first one of the candidate physical hardware resources is not to support two or more hypervisors, and further including deploying a rack interposer appliance on the first one of the first hypervisors, the rack interposer appliance is to obtain a message from a first one of the one or more virtual machines on a first one of the second hypervisors directed to the first one of the second hypervisors, and transmit the message to the first one of the first hypervisors instead of the first one of the second hypervisors.

Example 18 includes the method of example 15, wherein the physical hardware resources are first physical hardware resources, and further including identifying the one or more virtual machines on second physical hardware resources to migrate to the candidate physical hardware resources, migrating the one or more virtual machines to the candidate physical hardware resources when the one or more virtual machines are deployed to the second hypervisors, upgrading the second physical hardware resources from a first version to a second version, migrating the one or more virtual machines back to the second physical hardware resources when the second physical hardware resources are upgraded to the second version, and decommissioning the nested virtual server rack when the one or more virtual machines are migrated back to the second physical hardware resources.

Example 19 includes the method of example 18, wherein decommissioning the nested virtual server rack includes deallocating the candidate physical hardware resources from the nested virtual server rack and returning the candidate physical hardware resources to a pool of available resources.

Example 20 includes the method of example 15, wherein the nested virtual server rack is to execute the one or more computing tasks by instructing, with a first one of the second hypervisors, a first one of the first hypervisors to execute the one or more computing tasks, and instructing, with the first one of the first hypervisors, one or more of the candidate physical hardware resources to execute the one or more computing tasks.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. A system to generate a first nested virtual server rack in a virtual server environment, the system comprising:
    a first physical server rack of a plurality of physical server racks of the virtual server environment, the first physical server rack to instantiate nested rack manager circuitry, the nested rack manager circuitry to instantiate resource discoverer circuitry and nested rack controller circuitry;
    a second physical server rack of the plurality of physical server racks, the second physical server rack to instantiate a non-nested virtual server rack, the second physical server rack to include a plurality of server host nodes, the plurality of server host nodes to include a first server host node with a first hypervisor on the non-nested virtual server rack and a second server host node with a second hypervisor on the non-nested virtual server rack;
    the resource discoverer circuitry to:
        identify first physical hardware resources from the second physical server rack for generation of the first nested virtual server rack, the first physical hardware resources to be identified:
            based on a nested rack allocation parameter indicative of whether one or more of the plurality of server host nodes are allocated for the first nested virtual server rack; and
            after a determination that the one or more of the plurality of server host nodes are not allocated to a second nested virtual server rack in the virtual server environment, the determination based on the nested rack allocation parameter;
        determine candidate physical hardware resources from the first physical hardware resources based on a capacity parameter that indicates that the first server host node and the second server host node are available to generate the first nested virtual server rack;

the nested rack controller circuitry to generate the first nested virtual server rack based on deployment of (i) a first nested hypervisor on the first hypervisor and a second nested hypervisor on the second hypervisor and (ii) a first virtual machine on the first nested hypervisor and a second virtual machine on the second nested hypervisor; and migrate one or more third virtual machines from third hypervisors of second physical hardware resources of a third physical server rack to at least one of the first virtual machine or the second virtual machine after an upgrade of ones of the second physical hardware resources, wherein at least one of the first nested hypervisor or the second nested hypervisor to facilitate communication between the candidate physical hardware resources and the at least one of the first virtual machine or the second virtual machine, the first nested virtual server rack to execute one or more computing tasks based on the communication.

2. The system of claim 1, wherein the one or more computing tasks are one or more first computing tasks, the nested rack manager circuitry to instantiate resource data aggregator circuitry, and the resource data aggregator circuitry to:

determine a utilization parameter indicative of a quantity of the first physical hardware resources being utilized to execute a second computing task; and determine the capacity parameter based on the utilization parameter.

3. The system of claim 1, wherein a first one of the candidate physical hardware resources is in communication with the first hypervisor, the first one of the candidate physical hardware resources is not to support the first nested hypervisor, and the second physical server rack to instantiate rack interposer deployer circuitry to deploy a rack interposer appliance on the first hypervisor, the rack interposer appliance to:

obtain a message from the first virtual machine directed to the first nested hypervisor; and transmit the message to the first hypervisor instead of the first nested hypervisor.

4. The system of claim 3, wherein the first one of the candidate physical hardware resources is a graphics processing unit (GPU) or a universal serial bus (USB) device.

5. The system of claim 1, wherein the nested rack manager circuitry is to instantiate resource deallocator circuitry, and wherein:

the resource discoverer circuitry is to identify the one or more third virtual machines on the second physical hardware resources to migrate to the at least one of the first virtual machine or the second virtual machine of the candidate physical hardware resources;

the nested rack controller circuitry is to:

upgrade the second physical hardware resources from a first version to a second version; and migrate the at least one of the first virtual machine or the second virtual machine back to the second physical hardware resources after the upgrade of the second physical hardware resources; and the resource deallocator circuitry is to decommission the first nested virtual server rack after the migration of the at least one of the first virtual machine or the second virtual machine back to the second physical hardware resources.

6. The system of claim 5, wherein the resource deallocator circuitry is to deallocate the candidate physical hardware resources from the first nested virtual server rack and return the candidate physical hardware resources to a pool of available resources.

7. The system of claim 1, wherein the first nested virtual server rack is to:

instruct, with the first nested hypervisor, the first hypervisor to execute the one or more computing tasks; and instruct, with the first hypervisor, one or more of the candidate physical hardware resources to execute the one or more computing tasks.

8. The system of claim 1, wherein the one or more third virtual machines are instantiated on the first physical server rack.

9. A non-transitory computer readable storage medium comprising instructions which, when executed, cause a machine to at least:

instantiate a nested rack manager on a first physical server rack of a plurality of physical server racks of a virtual server environment, the nested rack manager to instantiate a resource discoverer and a nested rack controller;

instantiate a non-nested virtual server rack on a second physical server rack of the plurality of physical server racks, the second physical server rack to include a plurality of server host nodes, the plurality of server host nodes to include a first server host node with a first hypervisor on the non-nested virtual server rack and a second server host node with a second hypervisor on the non-nested virtual server rack;

cause the resource discoverer to:

identify first physical hardware resources from the second physical server rack as available to instantiate a first nested virtual server rack, the first physical hardware resources to be identified:

based on a nested rack allocation parameter indicative of whether one or more of the plurality of server host nodes are allocated for the first nested virtual server rack; and after a determination that the one or more of the plurality of server host nodes are not allocated to a second nested virtual server rack in the virtual server environment based on the nested rack allocation parameter; and determine candidate physical hardware resources from the first physical hardware resources based on a capacity parameter that indicates that the first server host node and the second server host node are available to instantiate the first nested virtual server rack; and cause the nested rack controller to:

create the first nested virtual server rack based on deployment of (i) a first nested hypervisor on the first hypervisor and a second nested hypervisor on the second hypervisor and (ii) a first virtual machine on the first nested hypervisor and a second virtual machine on the second nested hypervisor; and migrate one or more applications installed on one or more third virtual machines from third hypervisors of second physical hardware resources of a third physical server rack to at least one of the first virtual machine or the second virtual machine after an upgrade of ones of the second physical hardware resources, wherein at least one of the first nested hypervisor or the second nested hypervisor to facilitate communication between the candidate physical hardware resources and the at least one of the first virtual machine or the second virtual machine, the first nested virtual server rack to execute one or more workloads based on the communication.

10. The non-transitory computer readable storage medium of claim 9, wherein the one or more workloads are one or more first workloads, and the instructions, when executed, cause the machine to:
determine a utilization parameter indicative of a quantity of the first physical hardware resources being utilized to execute a second workload; and
determine the capacity parameter based on the utilization parameter.

11. The non-transitory computer readable storage medium of claim 9, wherein a first one of the candidate physical hardware resources is in communication with the first hypervisor, the first one of the candidate physical hardware resources is not to support the first nested hypervisor, and the instructions, when executed, cause the machine to deploy a rack interposer appliance on the first hypervisor, the rack interposer appliance to:
obtain a message from the first virtual machine directed to the first nested hypervisor; and
transmit the message to the first hypervisor instead of the first nested hypervisor.

12. The non-transitory computer readable storage medium of claim 11, wherein the first one of the candidate physical hardware resources is a graphics processing unit (GPU) or a universal serial bus (USB) device.

13. The non-transitory computer readable storage medium of claim 9, wherein the instructions, when executed, cause the machine to:
identify the one or more third virtual machines on the second physical hardware resources;
upgrade the second physical hardware resources from a first version to a second version;
migrate hosting of the one or more applications back to the second physical hardware resources after the upgrade of the second physical hardware resources; and
decommission the first nested virtual server rack after the migration of the hosting of the one or more third virtual machines back to the second physical hardware resources.

14. The non-transitory computer readable storage medium of claim 13, wherein the instructions, when executed, cause the machine to deallocate the candidate physical hardware resources from the first nested virtual server rack and return the candidate physical hardware resources to a pool of available resources.

15. The non-transitory computer readable storage medium of claim 9, wherein the instructions, when executed, cause the machine to cause the first nested virtual server rack to:
instruct, with the first nested hypervisor, the first hypervisor to execute the one or more workloads; and
instruct, with the first hypervisor, one or more of the candidate physical hardware resources to execute the one or more workloads.

16. A method to generate a first nested virtual server rack in a virtual server environment, the method comprising:
establishing a nested rack manager on a first physical server rack of a plurality of physical server racks of the virtual server environment, the nested rack manager including a resource discoverer and a nested rack controller;
establishing an unnested virtual server rack on a second physical server rack of the plurality of physical server racks, the second physical server rack to include a plurality of server host nodes, the plurality of server host nodes to include a first server host node with a first hypervisor on the unnested virtual server rack and a second server host node with a second hypervisor on the unnested virtual server rack;
causing the resource discoverer to:
identify first physical hardware resources from the second physical server racks for generation of the first nested virtual server rack, the identifying of the first physical hardware resources:
based on a nested rack allocation parameter indicative of whether one or more of the plurality of server host nodes are allocated for the first nested virtual server rack; and
after a determination that the one or more of the plurality of server host nodes are not allocated to a second nested virtual server rack in the virtual server environment based on the nested rack allocation parameter; and
determine candidate physical hardware resources from the first physical hardware resources based on a capacity parameter indicative of the first server host node and the second server host node being available for generation of the first nested virtual server rack; and
causing the nested rack controller to:
generate the first nested virtual server rack based on deployment of (i) a first nested hypervisor on the first hypervisor and a second nested hypervisor on the second hypervisor and (ii) a first virtual machine on the first nested hypervisor and a second virtual machine on the second nested hypervisor; and
migrate data on one or more third virtual machines from third hypervisors of second physical hardware resources of a third physical server rack to at least one of the first virtual machine or the second virtual machine after an upgrade of ones of the second physical hardware resources, wherein at least one of the first nested hypervisor or the second nested hypervisor to facilitate communication between the candidate physical hardware resources and the at least one of the first virtual machine or the third virtual machine, the first nested virtual server rack to execute a workload based on the communication.

17. The method of claim 16, wherein the workload is a first workload, and the method further including:
determining a utilization parameter indicative of a quantity of the first physical hardware resources being utilized to execute a second workload; and
determining the capacity parameter based on the utilization parameter.

18. The method of claim 16, wherein a first one of the candidate physical hardware resources is in communication with the first hypervisor, the first one of the candidate physical hardware resources unable to support the first nested hypervisor, and the method further including deploying a rack interposer appliance on the first hypervisor, the rack interposer appliance to:
obtain a message from the first virtual machine directed to the first nested hypervisor; and
transmit the message to the first hypervisor instead of the first nested hypervisor.

19. The method of claim 16, further including:
identifying the data on the one or more third virtual machines on the second physical hardware resources to migrate to the at least one of the first virtual machine or the second virtual machine of the candidate physical hardware resources;
upgrading the second physical hardware resources from a first version to a second version;
migrating the data on the at least one of the first virtual machine or the second virtual machine back to the second physical hardware resources in after upgrading the second physical hardware resources; and
decommissioning the first nested virtual server rack after migrating the data back to the second physical hardware resources.

20. The method of claim 19, wherein the decommissioning of the first nested virtual server rack includes deallocating the candidate physical hardware resources from the first nested virtual server rack and returning the candidate physical hardware resources to a pool of available resources.

21. The method of claim 16, wherein the first nested virtual server rack is to execute the one or more computing tasks by:
instructing, with the first nested hypervisor, the first hypervisor to execute the workload; and
instructing, with the first hypervisor, one or more of the candidate physical hardware resources to execute the workload.

* * * * *